United States Patent

Hayashi et al.

[11] Patent Number: 5,575,151
[45] Date of Patent: Nov. 19, 1996

[54] SWASH PLATE TYPE HYDRAULIC ACTUATOR WITH VARIABLE ECCENTRICITIES

[75] Inventors: Tsutomu Hayashi; Yoshihiro Nakajima, both of Saitama, Japan

[73] Assignee: Honda Giken Kogyo Kabushiki Kaisha, Tokyo, Japan

[21] Appl. No.: 366,039

[22] Filed: Dec. 29, 1994

[30] Foreign Application Priority Data

Dec. 29, 1993 [JP] Japan .................................. 5-353965

[51] Int. Cl.⁶ .............................. F16H 39/14; F16H 61/40
[52] U.S. Cl. ................................. 60/489; 91/482; 60/494
[58] Field of Search ........................... 60/489, 494, 487; 91/482, 478, 479, 480

[56] References Cited

U.S. PATENT DOCUMENTS

| | | | |
|---|---|---|---|
| 4,735,050 | 4/1988 | Hayashi et al. | 60/489 |
| 4,745,748 | 5/1988 | Hayashi et al. | 60/489 |
| 4,781,022 | 11/1988 | Hayashi et al. | 60/489 |
| 4,827,721 | 5/1989 | Hayashi et al. | 60/489 |
| 4,914,914 | 4/1990 | Inoue | 60/489 |
| 4,916,901 | 4/1990 | Hayashi et al. | 60/489 |
| 4,938,024 | 7/1990 | Matsuto et al. | 91/482 X |
| 5,054,289 | 10/1991 | Nagatomo | 60/489 X |
| 5,060,477 | 10/1991 | Hayashi et al. | 60/489 X |
| 5,065,578 | 11/1991 | Nakajima et al. | 60/489 X |
| 5,353,595 | 10/1994 | Hayashi et al. | 60/494 X |

FOREIGN PATENT DOCUMENTS

| | | | |
|---|---|---|---|
| 1075859 | 4/1954 | France | 60/487 |
| 3904945 | 8/1989 | Germany | 60/487 |
| 62-224769 | 10/1987 | Japan | 60/487 |
| 63-152765 | 6/1988 | Japan | 60/487 |

OTHER PUBLICATIONS

English constitution of Japanese Patent Laid-open (Kokai) No. H3-162972, Jul. 12, 1991 Japanse abstract, 3-162972(A).

Primary Examiner—John E. Ryznic
Attorney, Agent, or Firm—Birch, Stewart, Kolasch & Birch, LLP

[57] ABSTRACT

The present invention provides a swash plate type hydraulic actuator comprising cylinders provided with an inner oil passage, an outer oil passage, cylinder bores, radial valve holes extending between the inner oil passage and the outer oil passages, and ports opening into the cylinder bores and the valve holes, respectively. Distributing valves are slidably fitted in the valve holes for connecting the ports alternately to the inner oil passage and the outer oil passage. Swash plate holders, swash plates and eccentric rings supported on the swash plate holders so as to be engaged with the outer ends of the distributing valves respectively, are provided. Plungers are slidably fitted in the cylinder bores, respectively, in which the displacement can be changed whether or not the inclination of the swash plates is variable. Eccentric radius changing mechanisms for changing the effective stroke of plungers by changing the eccentric radii of eccentric rings relative to cylinders are connected to the eccentric rings capable of being moved radially of the cylinders.

23 Claims, 17 Drawing Sheets

5,575,151

SWASH PLATE TYPE HYDRAULIC ACTUATOR WITH VARIABLE ECCENTRICITIES

BACKGROUND OF THE INVENTION

1. Field of the Invention

The present invention relates to a swash plate type hydraulic actuator comprising a casing, cylinders supported for rotation on the casing and provided with a plurality of cylinder bores arranged on a circle. An annular inner oil passage is formed in the inner circumference thereof. An annular outer oil passage is formed in the outer circumference thereof. A plurality of radial valve holes extend between the annular inner oil passage and the annular outer oil passage and respectively having ports opening into the cylinder bores. Plungers are slidably fitted respectively in the cylinder bores. Swash plates and swash plate holders holding the swash plates, respectively, are provided so that the swash plates are in contact with one end of each of the plungers projecting from the cylinders. Distributing valves are slidably fitted in the valve holes so as to connect the ports alternately to the inner oil passage and the outer oil passage. Eccentric rings are held on the swash plate holders so as to be in contact with the outer ends of the distributing valves. A hydromechanical continuously variable speed transmission includes the swash plate-type hydraulic actuator. A method is disclosed for controlling the hydromechanical continuously variable speed transmission.

2. Description of Background Art

The aforesaid apparatus has been known and has been published in, for example, Japanese Patent Laid-open (Kokai) No. 3-162972.

The aforesaid prior art hydraulic continuously variable speed transmission comprises a fixed displacement swash plate hydraulic pump and a variable displacement swash plate type hydraulic motor. The displacement of the swash plate type hydraulic motor is changed by changing the inclination of the swash plate to change the stroke of the plungers. Since the swash plate of the hydraulic pump rotates and a complicated mechanism is necessary for changing the inclination of the rotating swash plate, only the hydraulic motor is of a variable displacement type. The displacement of the hydraulic motor must be increased to widen the range of the transmission gear ratio, which unavoidably increases the size and weight of the continuously variable speed transmission. Therefore, it has been desired to make the displacement variable whether or not the inclination of the swash plate is variable.

OBJECTS AND SUMMARY OF THE INVENTION

It is an object of the present invention to provide a swash plate type hydraulic actuator provided with plungers and a swash plate which is capable of varying the displacement by varying the effective stroke of the plungers whether or not the inclination of the swash plate is variable. A hydromechanical continuously variable speed transmission employs the swash plate type hydraulic actuator. A method is disclosed for controlling the hydromechanical continuously variable speed transmission.

With the foregoing object in view, a swash plate type hydraulic actuator comprises a casing with cylinders supported for rotation on the casing and provided with a plurality of cylinder bores arranged on a circle. An annular inner oil passage is formed in the inner circumference thereof. An annular outer oil passage is formed in the outer circumference thereof. A plurality of radial valve holes extend between the annular inner oil passage and the annular outer oil passage and, respectively, include ports opening into the cylinder bores. Plungers are slidably fitted, respectively, in the cylinder bores. Swash plates and swash plate holders holding the swash plates, respectively, are provided so that the swash plates are in contact with one end of each of the plungers projecting from the cylinders. Distributing valves are slidably fitted in the valve holes so as to connect the ports alternately to the inner oil passage and the outer oil passage. Eccentric rings are held on the swash plate holders so as to be in contact with the outer ends of the distributing valves. The eccentric rings can be shifted radially of the cylinders by eccentric radius changing means for changing the eccentric radii of the eccentric rings relative to the cylinders to change the effective stroke of the plungers.

In accordance with the invention, the swash plate holder is supported for rotation on the casing, and the swash plates are held at a fixed inclination to the axis of rotation of the cylinder on the swash plate holder.

In accordance with the invention, the distributing valves have lands for connecting the ports and the inner oil passage and disconnecting the ports from the inner oil passage by their axially inner ends and for connecting the ports and the outer oil passage and disconnecting the ports from the outer oil passage by their axially outer ends, $R_{f2}$ is greater than $R_{f1}$, $R_{02}$ is greater than $R_{01}$, and $(R_{02}-R_{f2})$ is approximately equal to $(R_{01}-R_{f1})$, where $R_{f1}$ is the radius of the circular locus of the inner edges of the ports along the axes of the valve holes, $R_{01}$ is the radius of the circular locus of the outer edges of the ports along the axes of the valve holes, $R_{f2}$ is the radius of the circular locus of the inner edges of the lands and $R_{02}$ is the radius of the circular locus of the outer edges of the lands.

In accordance with the invention, the eccentric radius changing means comprises a shifter movable along the axis of the cylinder, and a cam formed integrally with the shifter so as to extend axially obliquely from the shifter and to incline in one circumferential direction of the cylinder. The eccentric ring is in engagement with the cam so as to be controlled by the opposite surfaces of the cam extending along the circumferential direction of the cylinder.

In accordance with the invention, the shifter is connected to an electric motor.

In accordance with the invention, a control shaft is supported rotatably on the casing in parallel to the axis of the cylinder so as to be turned manually to determine its angular position. A shift drum is fixed to the control shaft. A shift fork is in engagement with the shift drum so that the position thereof along the axis of the cylinder is dependent on the angular position of the shift drum, and the shifter is in engagement with the shift fork.

In accordance with the invention, the swash plate holder holding the swash plate can be tilted about the axis of trunnions perpendicular to the axis of rotation of the cylinder.

In accordance with the invention, the eccentric radius changing means changes the eccentric radius of the eccentric ring according to the inclination of the swash plate.

In accordance with the invention, the eccentric ring is biased by a spring so that the center thereof is dislocated from the axis of the cylinder, and the eccentric radius changing means decreases the eccentric radius of the eccentric ring as the inclination of the swash plate is decreased.

In accordance with the invention, a hydromechanical continuously variable speed transmission includes a casing having a cylinder block supported for rotation on the casing and provided with a plurality of pump cylinder bores arranged on a circle. Motor cylinder bores are arranged on a circle. An annular inner oil passage is formed in the inner circumference thereof. An annular outer oil passage is formed in the outer circumference thereof. A plurality of radial first valve holes are formed so as to extend between the inner oil passage and the outer oil passage and to open at pump ports into the pump cylinder bores. A plurality of radial second valve holes are formed so as to extend between the inner oil passage and the outer oil passage and to open at motor ports into the motor cylinder bores. Pump plungers are slidably fitted in the pump cylinder bores. Motor plungers are slidably fitted in the motor cylinder bores. A pump swash plate is provided together with a pump swash plate holder rotatably supported on the casing and holding the pump swash plate at a fixed inclination so that the pump swash plate is in contact with one end of each of the pump plungers projecting from the cylinder block. A motor swash plate is provided together with a motor swash plate holder holding the motor swash plate so that the motor swash plate is in contact with one end of each of the motor plungers projecting from the cylinder block. First distributing valves are slidably fitted in the first valve holes to connect the pump ports alternately to the inner oil passage and the outer oil passage. Second distributing valves are slidably fitted in the second valve holes to connect the motor ports alternately to the inner oil passage and the outer oil passage. A first eccentric ring is supported on the pump swash plate holder so as to be in contact with the outer ends of the first distributing valves. A second eccentric ring is supported on the motor swash plate holder so as to be in contact with the outer ends of the second distributing valves. An eccentric radius changing means is connected to the first eccentric ring to change the eccentric radius of the first eccentric ring relative to the cylinder block to change the effective stroke of the pump plungers.

In accordance with the invention, the second eccentric ring is movable radially of the cylinder block and is biased by a spring so that the center thereof is dislocated in a direction from the axis of the cylinder block, and an eccentric radius changing means is connected to the second eccentric ring to decrease the eccentric radius of the second eccentric ring as the inclination of the motor swash plate is decreased.

In accordance with the invention, the second eccentric ring is movable radially of the cylinder block, and an eccentric radius changing means is connected to the second eccentric ring to move the second eccentric ring between an eccentric position to make an output shaft connected to a motor cylinder rotate in the normal direction and an eccentric position to make the output shaft rotate in the reverse direction.

In accordance with the invention, a method of controlling the hydromechanical continuously variable speed transmission is provided to increase the speed of the hydromechanical continuously variable speed transmission including increasing the eccentric radius of the first eccentric ring with the motor swash plate held at a maximum inclination, and decreasing the inclination of the motor swash plate after the eccentric radius of the first eccentric ring has reached a maximum.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

PREFERRED EMBODIMENTS OF THE INVENTION

Preferred embodiments of the present invention will be described hereinafter with reference to the accompanying drawings.

Figure 1:
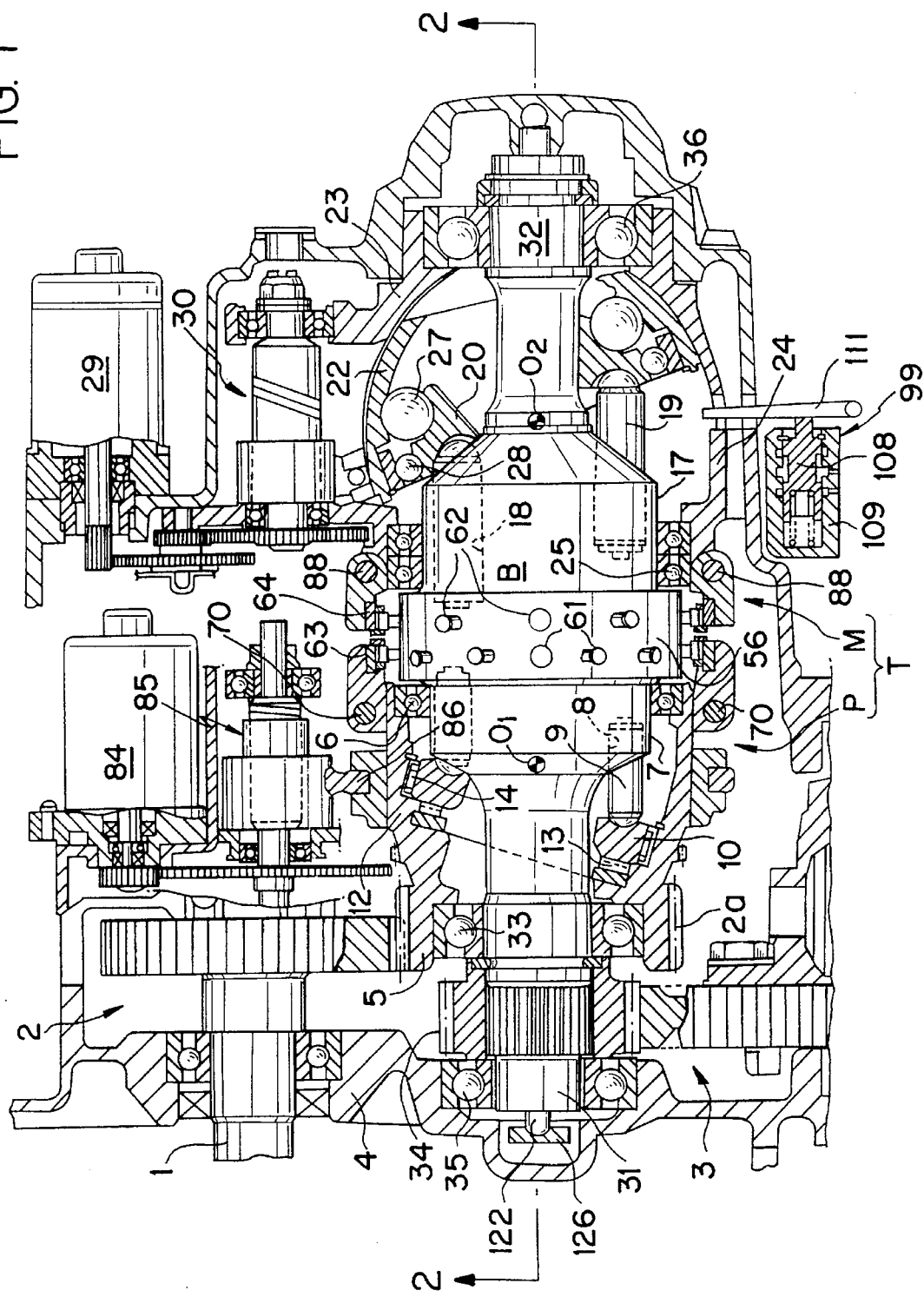
FIG. 1 is a longitudinal partial cross-sectional side view of a hydromechanical continuously variable speed transmission in a first embodiment according to the present invention.
Figure 2:
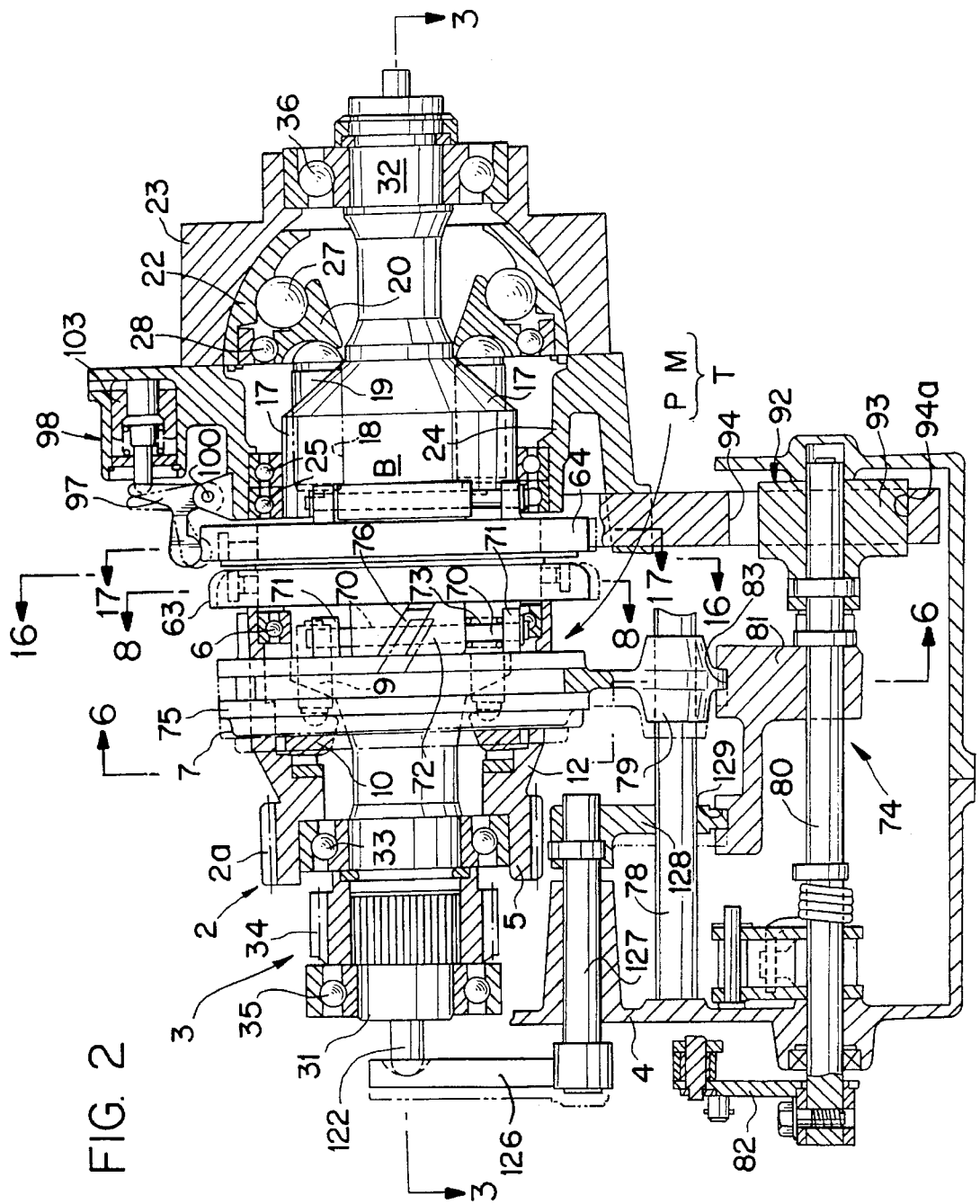
FIG. 2 is a cross-sectional view taken on line 2—2 in FIG. 1.

Referring first to FIGS. 1 and 2, the crankshaft 1 of an engine, not shown, of a four-wheel vehicle, and a hydromechanical continuously variable speed transmission T are contained in and supported on a casing 4. The hydromechanical continuously variable speed transmission T is disposed within the casing 4 with its hollow input shaft 5 and its output shaft 31 extend in parallel to the crankshaft 1. The crankshaft 1 is connected to the hollow input shaft 5 by a primary reduction gear 2, and the output shaft 31 is connected to the driving wheels, not shown, of the four-wheel vehicle by a secondary reduction gear 3.

The hydromechanical continuously variable speed transmission T has a closed hydraulic circuit comprising a swash plate type hydraulic pump P, i.e., a variable displacement swash plate type hydraulic actuator, and a swash plate type hydraulic motor M, i.e., a variable displacement swash plate type hydraulic actuator.

The swash plate type hydraulic pump P comprises the hollow input shaft 5 mounted with the output gear 2a of the primary reduction gear 2, a pump cylinder 7 disposed coaxially with the hollow input shaft 5 and provided with an odd number of pump cylinder bores 8 arranged on a circle having a center corresponding to the axis of rotation of the pump cylinder 7. A plurality of pump plungers 9 are slidably fitted respectively in the pump cylinder bores 8. A pump swash plate 10 is disposed with its front surface in contact with the outer ends of the pump plungers 9. A pump swash plate holder 12 supports the pump swash plate 10 on a thrust bearing 13 and in a radial bearing 14 thereon at a fixed inclination about an imaginary trunnion axis $0_1$ perpendicular to the axis of the pump cylinder 7. The pump swash plate holder 12 is formed integrally with the hollow input shaft 5. The pump cylinder 7 is supported for rotation relative to the hollow input shaft 5 in a ball bearing 6 on the pump swash plate holder 12.

The pump swash plate 10 causes the pump plungers 9 to reciprocate for a suction stroke and a discharge stroke as the hollow input shaft 5 rotates.

Figure 3:
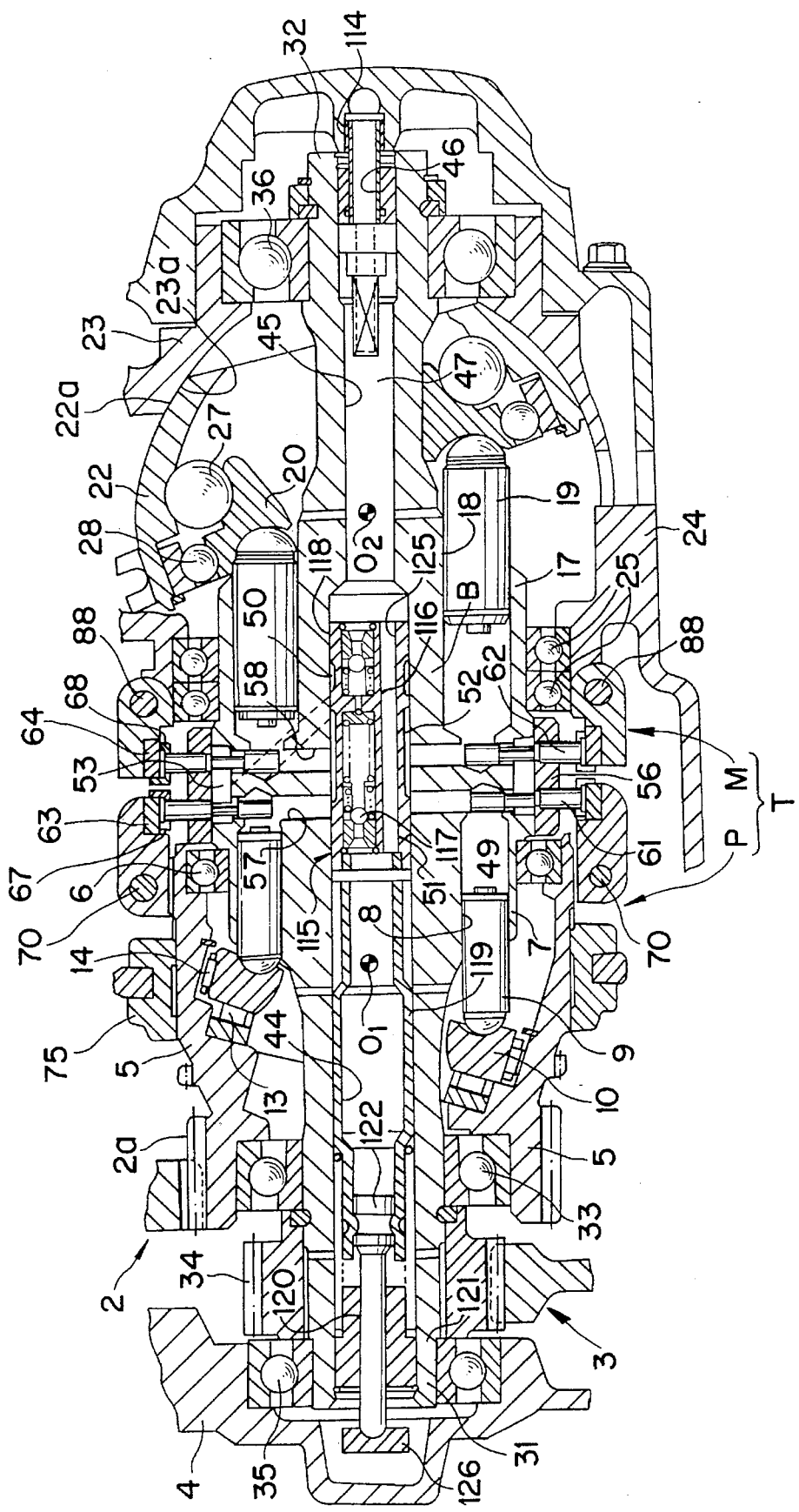
FIG. 3 is an enlarged sectional view taken on line 3—3 in FIG. 2.

The hydraulic motor M comprises a motor cylinder 17 shown on the right side of FIGS. 1 to 3, disposed coaxially with the pump cylinder 7 and provided with an odd number of motor cylinder bores 18 arranged on a circle having a center corresponding to the axis of rotation of the motor cylinder 17. A plurality of motor plungers 19 are respectively slidably fitted in the motor cylinder bores 18. A motor swash plate 20 is disposed with its front surface in contact with the outer ends of the motor plungers 19. A motor swash plate holder 22 is supported on a thrust bearing 27 and in a radial bearing 28 thereon. A motor swash plate anchor 23 supports the motor swash plate holder 22 at on a rear side. The respective contact surfaces 22a and 23a of the motor swash plate holder 22 and the motor swash plate anchor 23 are spherical surfaces having a center at the intersection of the axis of the motor cylinder 17 and a trunnion axis $0_2$. The motor swash plate holder 22 can be turned about the trunnion axis $0_2$ relative to the motor swash plate anchor 23.

A tubular cylinder holder 24 extends from one end of the motor swash plate anchor 23 on the side of the motor cylinder 17. The motor cylinder 17 is supported in ball bearings 25 on the cylinder holder 24.

The motor swash plate holder 22 is turned about the trunnion axis $0_2$ by a ball-and-screw mechanism 30 driven by a stepping motor 29 to turn the motor swash plate 20 between an upright position in which the motor swash plate 20 is perpendicular to the axis of the motor cylinder 17 and an inclined position in which the motor swash plate 20 is inclined at a given angle to the axis of the motor cylinder 17. When the motor swash plate 20 is in an inclined position, the motor plunger 19 is reciprocated for an expansion stroke and a contraction stroke as the motor cylinder 17 rotates.

The pump cylinder 7 and the motor cylinder 17 are united in a cylinder block B. The cylinder block B is provided integrally with the output shaft 31 and a shaft 32 coaxial with the output shaft 31. The shaft 32 projects from the center of the surface of the motor cylinder 17 facing the motor swash plate 20, and the output shaft 31 projects coaxially with the shaft 32 from the center of the surface of the pump cylinder 7 of the cylinder block B facing the pump swash plate 10.

The output shaft 31 extends through the pump swash plate 10 and the pump swash plate holder 12. The output shaft 31 is supported in an angular contact ball bearing 33 on the hollow input shaft 5. A ball bearing 35 is interposed between the output shaft 31 and the casing 4. The input gear 34 of the secondary reduction gear 3 is fixedly mounted on a portion of the output shaft 31 between the angular contact ball bearing 33 and the ball bearing 35.

The shaft 32 extends through the motor swash plate 20, the motor swash plate holder 22 and a motor swash plate anchor 23. An angular contact ball bearing 36 is interposed between the shaft 32 and the motor swash plate anchor 23.

Figure 4:
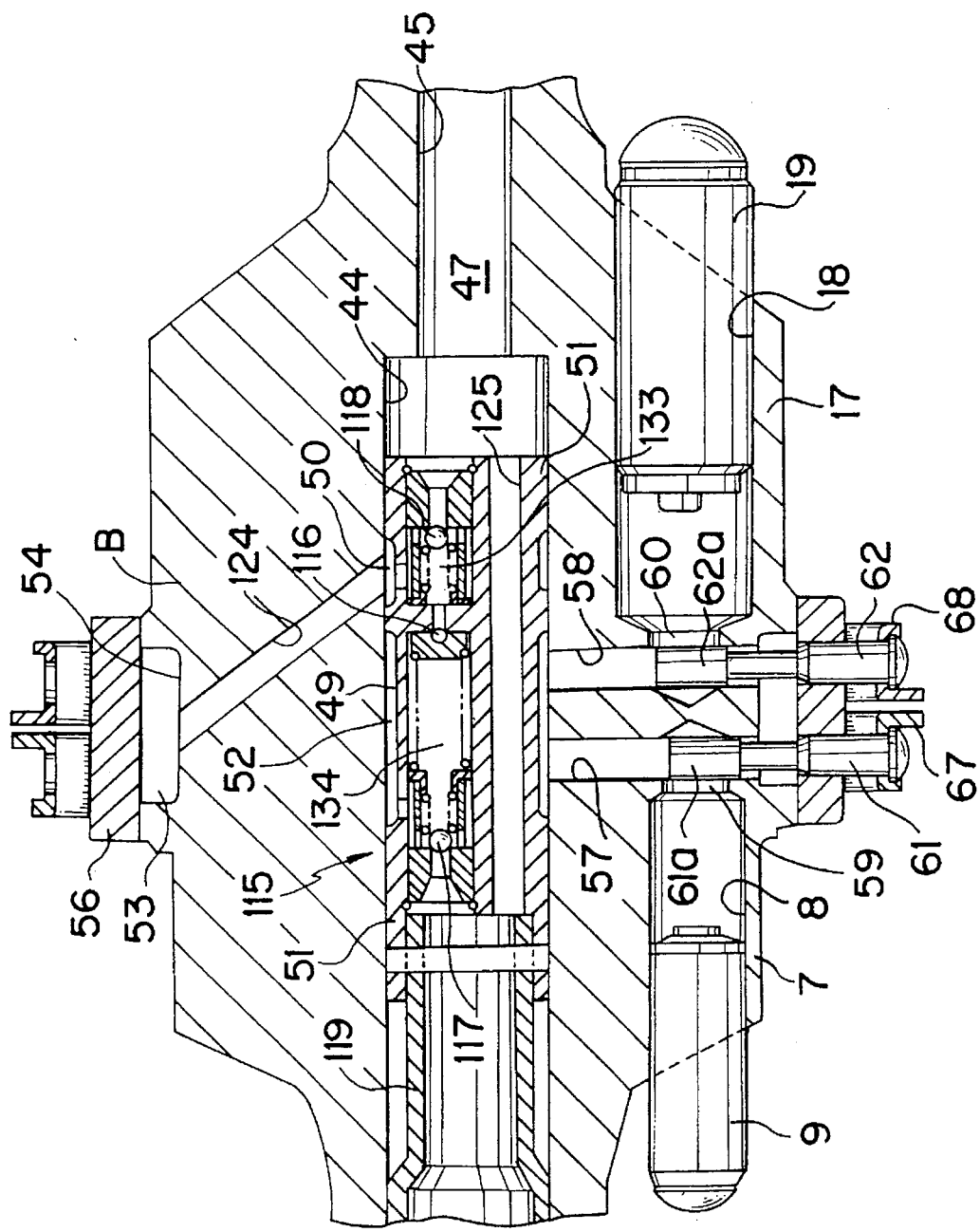
FIG. 4 is an enlarged view of an essential portion of FIG. 3, showing a clutch valve set at a position corresponding to a clutch disengagement state.
Figure 5:
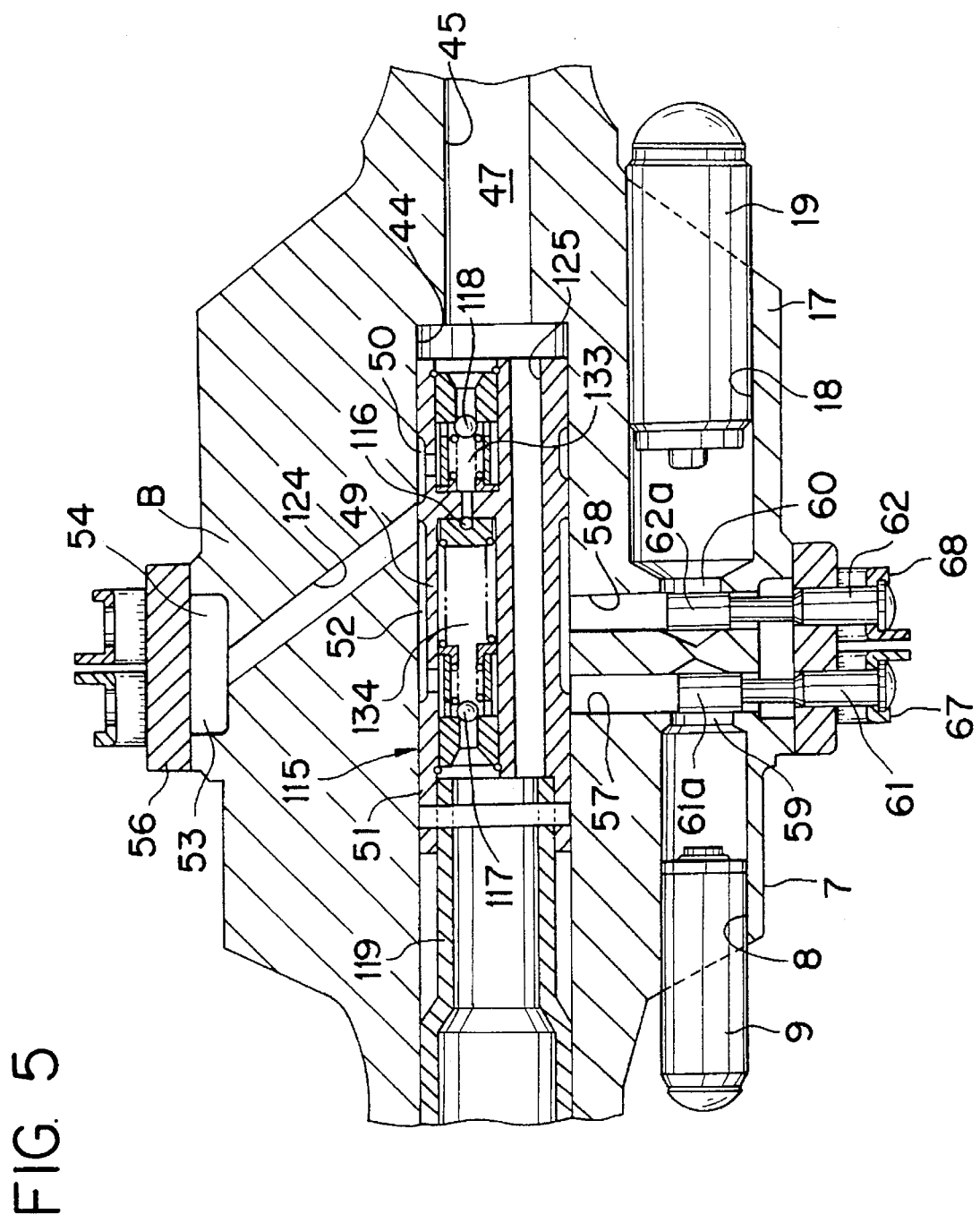
FIG. 5 is an enlarged view of an essential portion of FIG. 3, showing the clutch valve set at a position corresponding to a clutch engagement state.

Referring to FIGS. 3, 4 and 5, the cylinder block B is provided with a first bore 44, a second bore 45 having a diameter smaller than that of the first bore 44, and a third bore 46 having a diameter greater than that of the second bore 45 formed coaxially with the cylinder block B in that order from the side of the output shaft 31 toward the side of the shaft 32. The bores 44, 45 and 46 form an oil replenishing passage 47.

The cylinder block B is provided coaxially with an annular inner oil passage 52 and an annular outer oil passage 53 in a portion thereof between the group of the pump cylinder bores 8 of the pump cylinder 7 and the group of the motor cylinder bores 18 of the motor cylinder 17.

A substantially tubular valve element 51 provided in its outer circumference with a first annular groove 49 and a second annular groove 50 is slidably fitted in a portion of the oil replenishing passage near the first bore 44 and the second bore 45 of the cylinder block B. An inner oil passage 52 is defined by the circumference of the first bore 44 and the first annular groove 49.

An annular groove 54 is formed in the outer circumference of a portion of the cylinder block B between the group of the pump cylinder bores 8 and the group of the motor cylinder bores 18. A ring 56 is fixedly mounted on the cylinder block B so as to cover the annular groove 54 to form an annular outer oil passage 53 coaxial with the inner oil passage 52.

Radial first valve holes 57 and radial second valve holes 58 are formed through an annular wall between the inner oil passage 52 and the outer oil passage 53 of the cylinder block B in a portion of the cylinder block B between the group of the pump cylinder bores 8 of the pump cylinder 7 and the group of the motor cylinder bores 18 of the motor cylinder 17. The ring 56 serves as the outer circumferential wall of the outer oil passage 53. The number of the first valve holes 57 is equal to that of the pump cylinder bores 8, and the number of the second valve holes 58 is equal to that of the motor cylinder bores 18.

The cylinder block B is provided with a plurality of pump ports 59 by means of which the pump cylinder bores 8 communicate with the corresponding first valve holes 57, and a plurality of motor ports 60 by means of which the motor cylinder bores 18 communicate with the corresponding second valve holes 58.

First distributing valves 61 having the shape of a spool are slidably fitted in the first valve holes 57, and second distributing valves 62 having the shape of a spool are slidably fitted in the second valve holes 58. The first distributing valves 61 and the second distributing valves 62 are provided at their inner ends with lands 61a and 62a, respectively, to connect the pump ports 59 and the motor ports 60 to and to disconnect the same from the inner oil passage 52 by their inner ends, and to connect the pump ports 59 and the motor ports 60 to and to disconnect the same from the outer oil passage 53 by their outer ends.

The outer ends of all the first distributing valves 61 are in contact with a first eccentric ring 63, and the outer ends of all the second distributing valves 62 are in contact with a second eccentric ring 64. The outer ends of the first distributing valves 61 are interconnected by a first retaining ring 67 concentric with the first eccentric ring 63, and the outer ends of the second distributing valves 61 are interconnected by a retaining ring 68 concentric with the second eccentric ring 64.

The first eccentric ring 63 is connected by a pair of slide pins 70 parallel to the imaginary trunnion axis $0_1$ to the pump swash plate holder 12 in the following manner.

Figure 6:
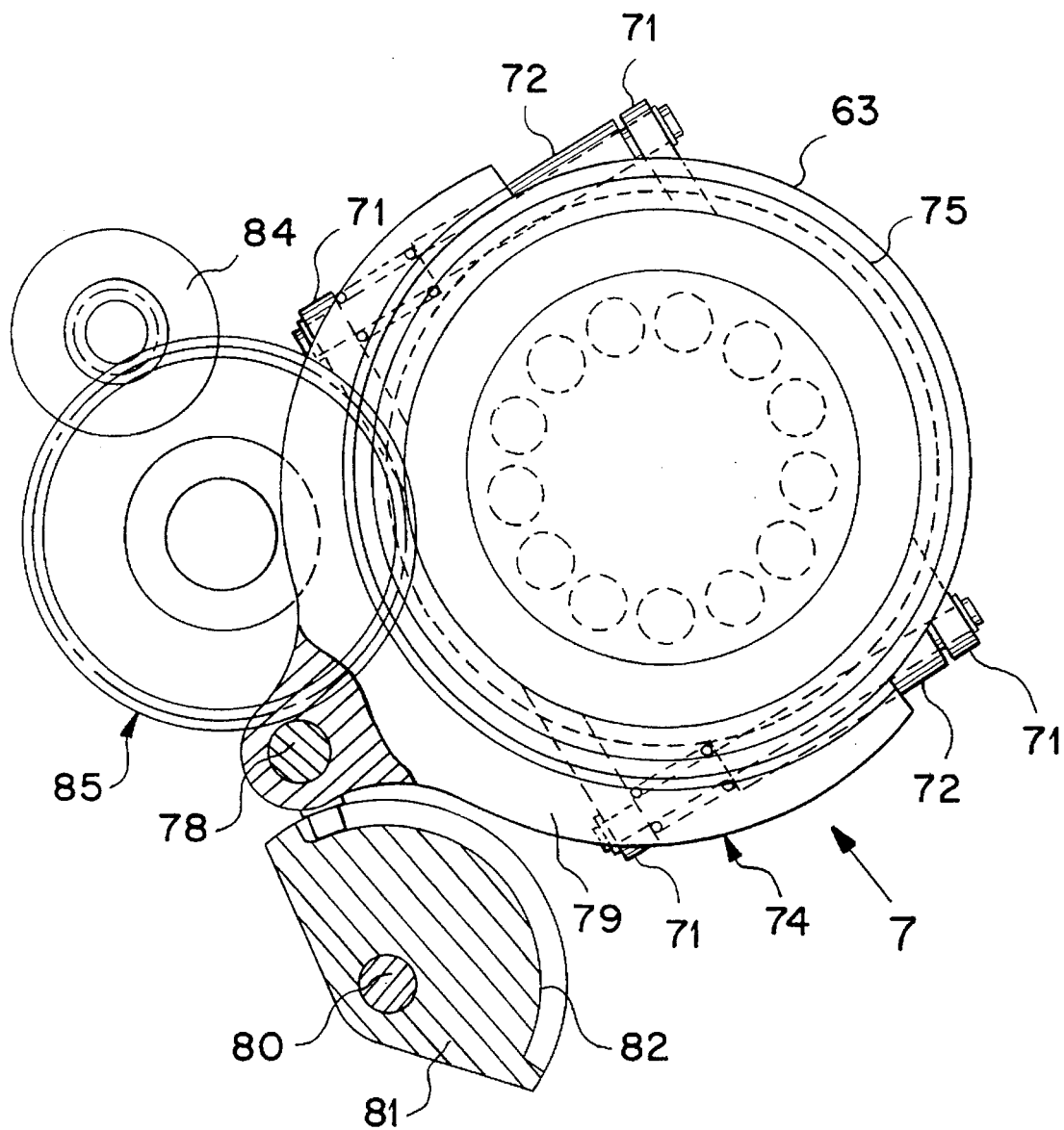
FIG. 6 is a sectional view taken on line 6—6 in FIG. 2.
Figure 7:
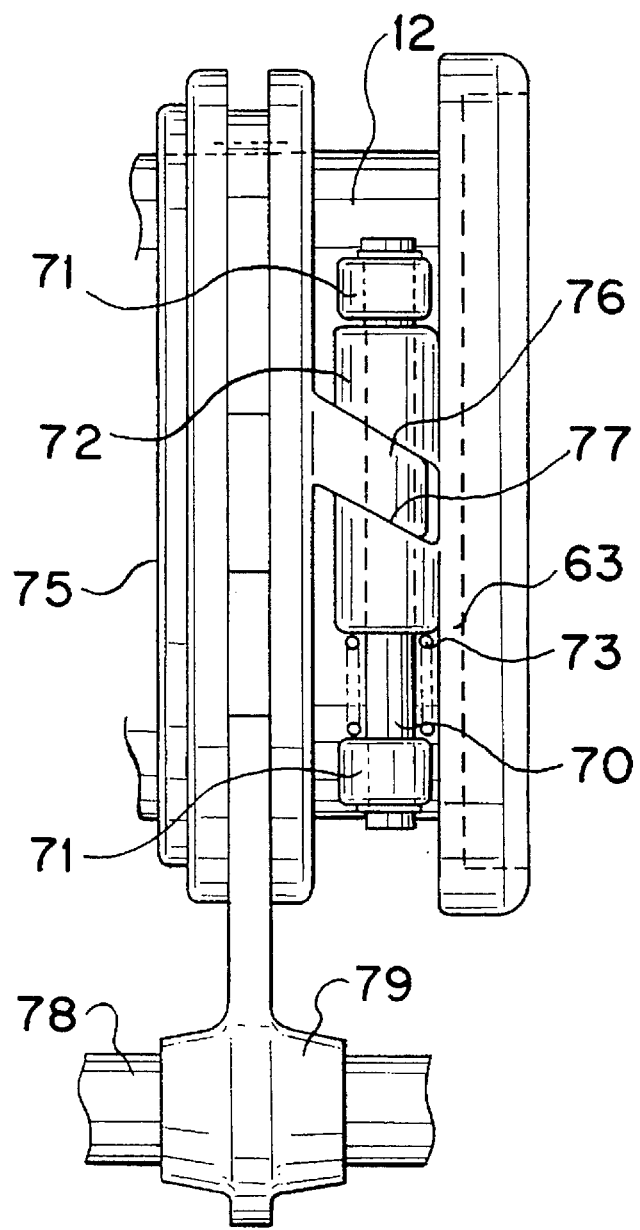
FIG. 7 is a side view taken along the direction of the arrow 7 in FIG. 6.

As shown in FIGS. 6 and 7, the opposite ends of the slide pin 70 slidably fitted in a guide boss 72 projecting from one end surface of the first eccentric ring 63 are fixed to a pair of knuckles 71 projecting from the outer surface of the pump swash plate holder 12. A compression spring 73 is disposed between one of the knuckles 71 and the guide boss 72 to bias the first eccentric ring 63 in an eccentric direction. Thus, the first eccentric ring 63 is movable along the imaginary trunnion axis $0_1$.

Figure 8:
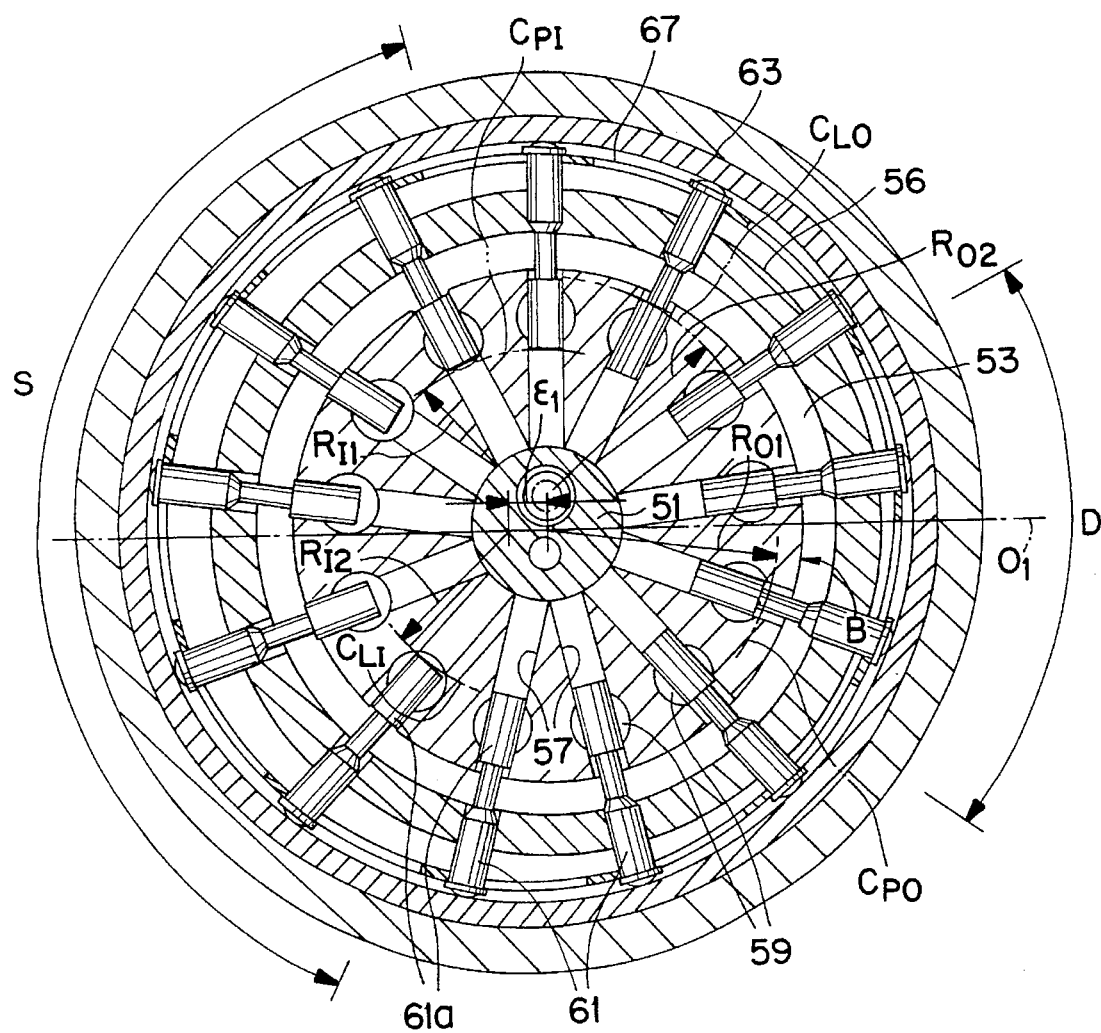
FIG. 8 is an enlarged sectional view taken on line 8—8 in FIG. 2.

The function of the first eccentric ring 63 will be described hereinafter with reference to FIG. 8. When the hollow input shaft 5 and the pump cylinder 7, i.e., the cylinder block B, rotate relative to each other, each first distributing valve 61 is reciprocated radially of the pump cylinder 7 for a stroke equal to twice the eccentric radius $\epsilon$ between an inner position and an outer position in the first valve hole 57 of the pump cylinder 7. In the discharge range D of the hydraulic pump P, the first distributing valve 61 is moved to the inner position to connect the corresponding pump port 59 to the outer oil passage 53 and to disconnect the same from the inner oil passage 52 to enable the pump plunger 9 in the discharge stroke to deliver the working fluid pressurized in the pump cylinder 8 into the outer oil passage 53. In the suction range S of the hydraulic pump P, the first distributing valve 61 is moved to the outer position to connect the corresponding pump port 59 to the inner oil passage 52 and to disconnect the same from the outer oil passage 53 to enable the pump plunger 9 in the suction stroke to suck the working fluid from the inner oil passage 52 into the pump cylinder bore 8.

Incidentally, the discharge range D changes when the eccentric radius $\epsilon$ of the first eccentric ring 63 is changed and, consequently, the number of effective pump plungers 9 among all the pump plungers 9 changes, more specifically, the effective stroke of all the pump plungers 9 changes, whereby the displacement of the swash plate type hydraulic pump P is changed. As shown in FIGS. 11–14, the phase angle of the discharge range D, which is defined as the angle of a line bisecting the discharge range D, remains constant as the discharge range D varies. A first eccentric radius changing mechanism 74 is connected to the first eccentric ring 63.

The first eccentric radius changing mechanism 74 includes a shifter 75 supported on the swash plate holder 12 so as to be movable along the axis of the cylinder block B. A cam 76 is formed integrally with the shifter 75 so as to extend axially obliquely from the shifter 75 and to incline in one circumferential direction of the cylinder block B. A shift fork 79 is supported on a shift shaft 78 fixed to the casing 4 with its axis in parallel to the axis of the cylinder block B so as to be movable along the axis of the shift shaft 78, and in engagement with the shifter 75. A control shaft 80 is rotatably supported on the casing 4 with its axis in parallel to the shift axis 78 so as to be turned manually to be set at a desired angular position. A shift drum 81 fixedly mounted on the control shaft 80.

The cam 76 is in engagement with the guide boss 72 formed integrally with the first eccentric ring 63 so as to determine the position of the first eccentric ring 63 with respect to the radial direction of the cylinder block B by its opposite surfaces. The guide boss 72 is provided with a groove 77 and the cam 76 is received in the groove 77 with the opposite surfaces thereof in sliding contact with the side surfaces of the groove 77. A lever 82 is fixed to one end of the control shaft 78 projecting outside from the casing 4. The lever 82 is operated manually to turn the control shaft 78.

Figure 9:
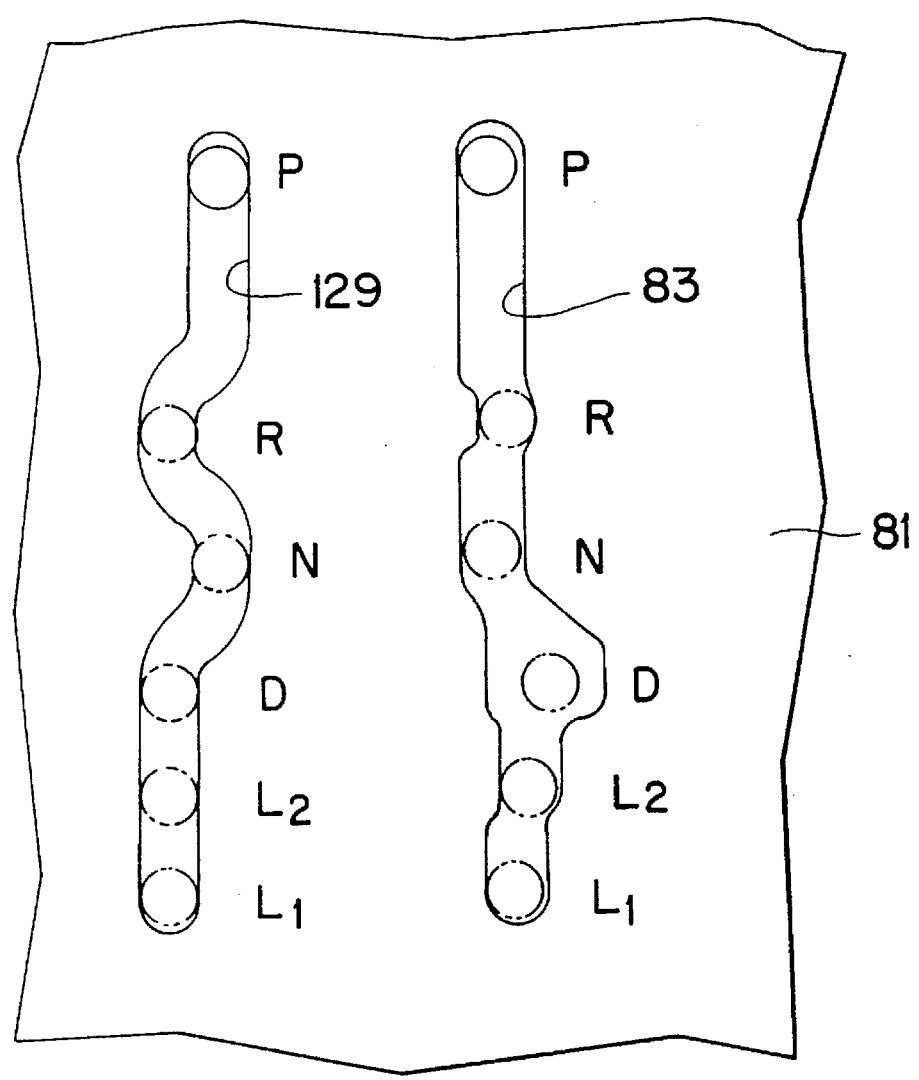
FIG. 9 illustrates the cam grooves of a shift drum.

Incidentally, the shift drum 81 is provided with a first cam groove 83 and the shift fork 79 is in engagement with the first cam groove 83. As shown in FIG. 9, when the shift drum 81 is turned by the driver driving the vehicle, the first cam groove 83 shifts the shifter 75 axially through the shift fork 79 to a parking position P, a reverse position R, a neutral position N, a drive position D, a second speed holding position $L_2$ or a first speed holding position $L_1$. The shifter 75 remains at the same position on the axis of the cylinder block B for the parking position P and the neutral position N. When the shift fork 79 is shifted to a position corresponding to the reverse position R or the first speed holding position $L_1$, the shifter 75 is moved to the right, as shown in FIG. 7, from the parking position P or the neutral position N. When the shift fork 79 is shifted to a position $L_2$ corresponding to the second speed holding position, the shifter 75 is moved to the second speed holding position $L_2$ on the right side of the first speed holding position $L_1$ as shown in FIG. 7. When the shift fork 79 is shifted to a position corresponding to the drive position D, the shifter 75 can be moved in a range between the neutral position N and a position on the right side of the second speed holding position $L_2$. As the shifter 75 is moved to the right, as viewed in FIG. 7, the eccentric radius $\epsilon_1$ of the first eccentric ring 63 increases.

Another shift fork 86 is engaged with the shifter 75 to move the shifter 75 in opposite directions along the axis of the cylinder block B in a range limited by the first cam groove 83 when the shifter 75 is set at the drive position D. The shift fork 86 is driven through a ball-and-screw mechanism 85 by a stepping motor 84, i.e., an electric motor. The shift fork 86 is driven by the stepping motor 84 to move the shifter 75 along the axis of the cylinder block B to change the eccentric radius $\epsilon_1$ of the first eccentric ring 63.

Incidentally, the position of each pump port 59 on the corresponding first valve hole 57 and the size of each first distributing valve 61 must meet the following conditions to change the displacement of the swash plate type hydraulic pump P by changing the eccentric radius $\epsilon_1$ of the first eccentric ring 63 by the first eccentric radius changing mechanism 74 and the stepping motor 84. Referring to FIG. 8, when $C_{PI}$ is the locus of the inner edge of the pump port 59 along the axis of the first valve hole 57, $R_{I1}$ is the radius of the locus $C_{PI}$, $C_{PO}$ is the locus of the outer edge of the pump port 59 along the axis of the first valve hole 57, $R_{O1}$ is the radius of the locus $C_{PO}$, $C_{LI}$ is the locus of the inner end of the land 61a of the first distributing valve 61, $R_{I2}$ is the radius of the locus $C_{LI}$, and $C_{LO}$ is the locus of the outer edge of the land 61a, and $R_{O2}$ is the radius of the locus $C_{LO}$, $R_{I2} > R_{I1}$, $R_{O2} > R_{O1}$, and $(R_{O2} - R_{I2}) - (R_{O1} - R_{I2})$).

Figure 10:
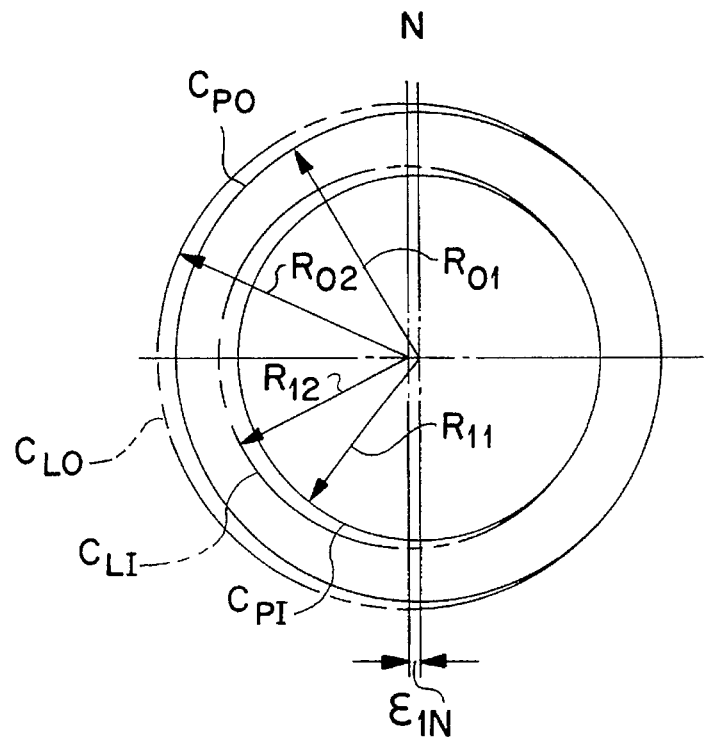
FIG. 10 is a diagrammatic view showing eccentric radii when the transmission is in a neutral position.
Figure 11:
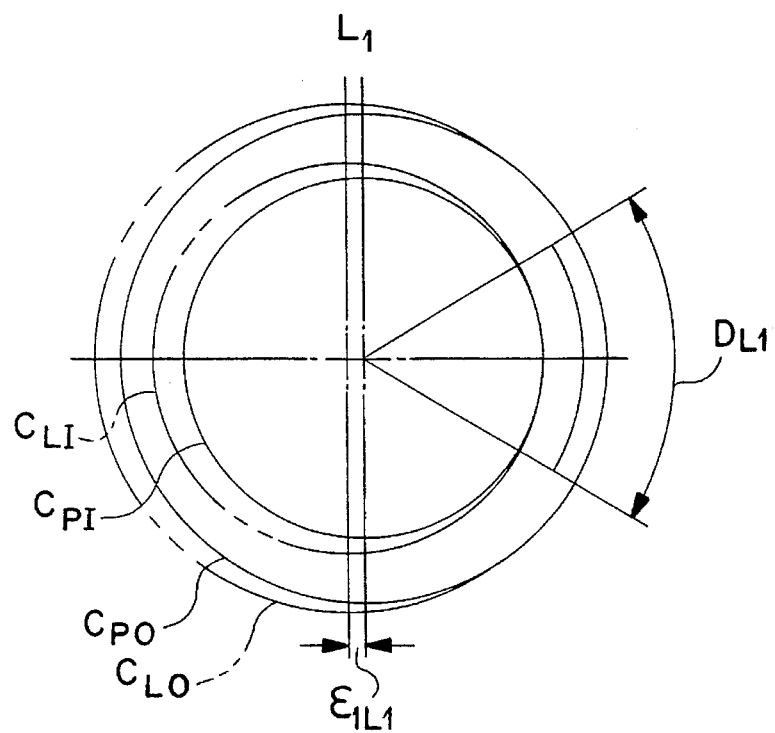
FIG. 11 is a diagrammatic view showing eccentric radii when the transmission is in a first speed holding position.
Figure 12:
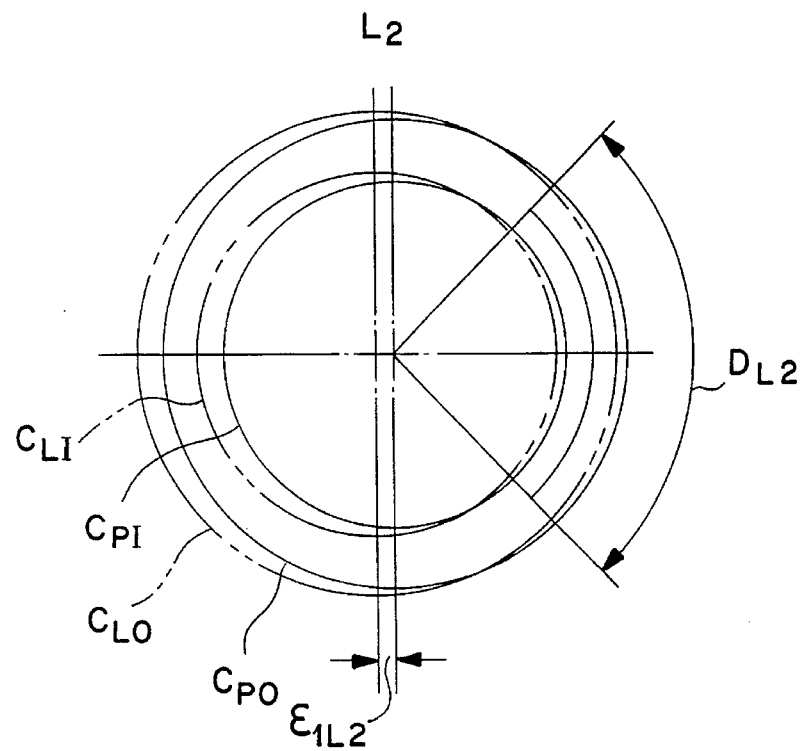
FIG. 12 is a diagrammatic view showing eccentric radii when the transmission is in a second speed holding position.
Figure 13:
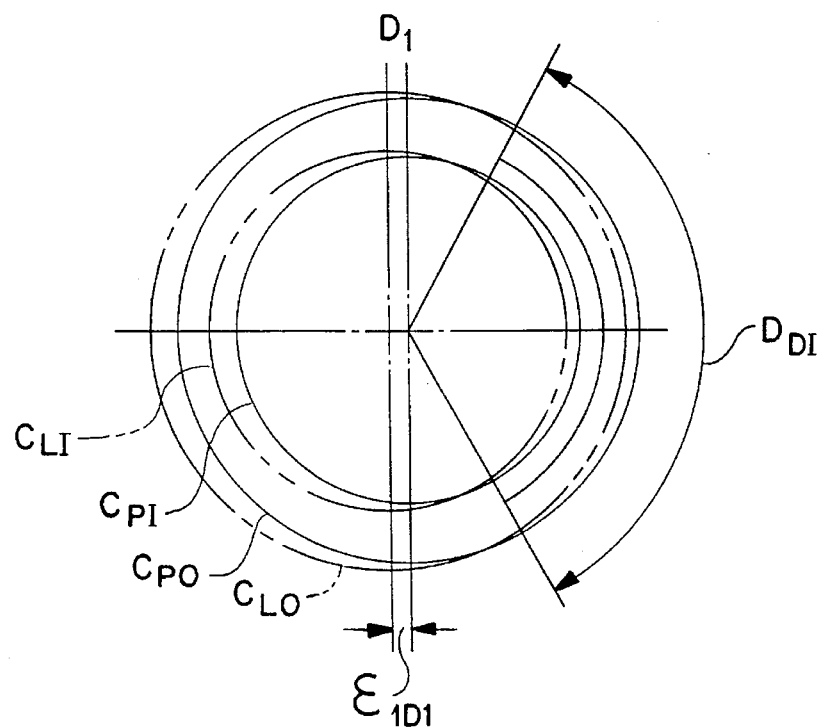
FIG. 13 is a diagrammatic view showing eccentric radii when the transmission is in a drive position.
Figure 14:
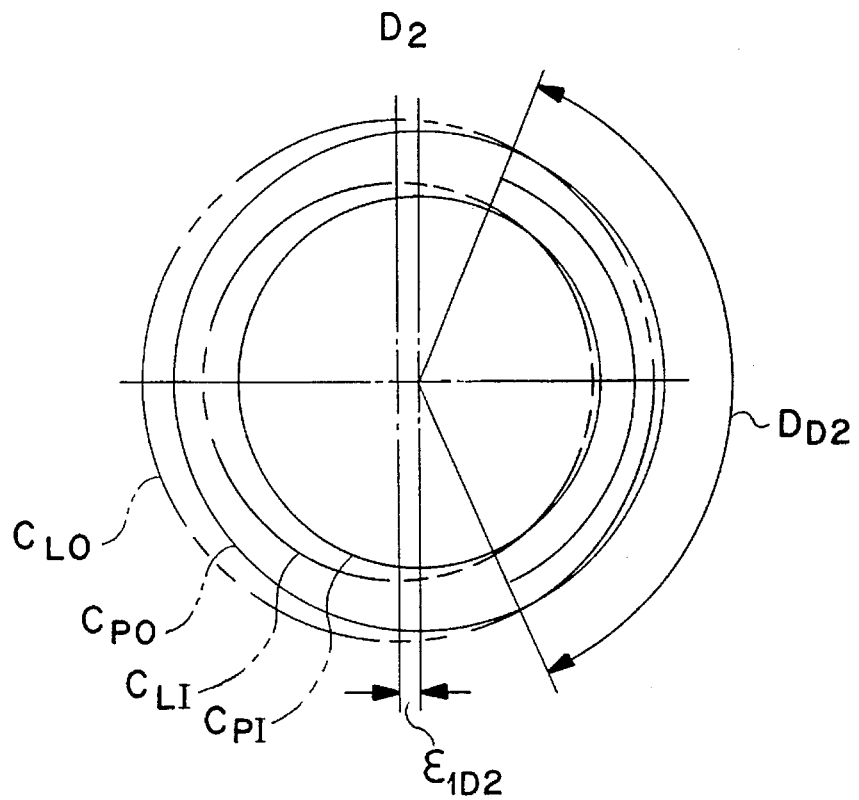
FIG. 14 is a diagrammatic view showing maximum eccentric radii when the transmission is in the drive position.
Figure 15:
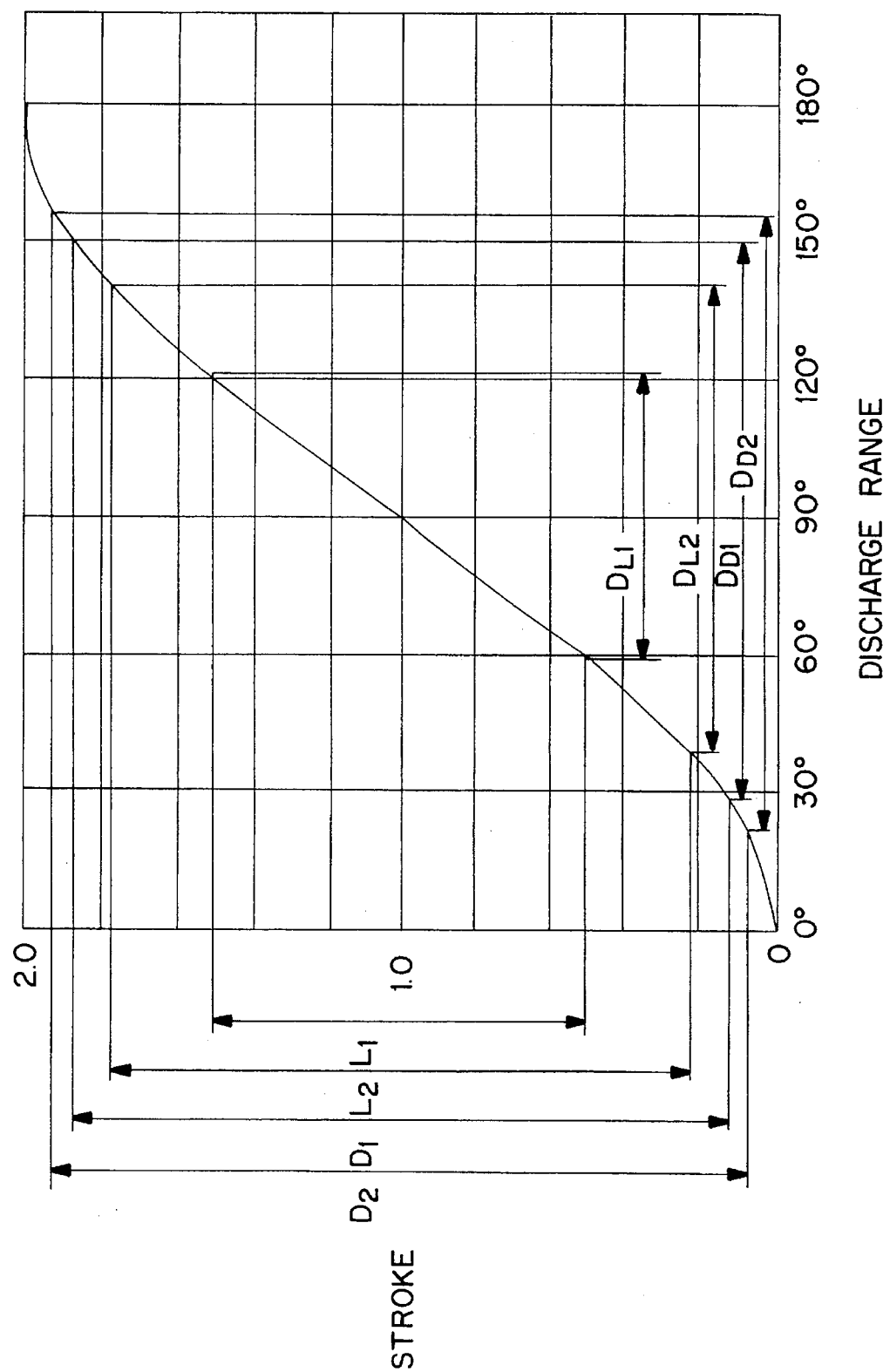
FIG. 15 is a graph showing the relation between the discharge range of a hydraulic pump and the effective stroke of a plunger.

When the shifter 75 is moved to the neutral position N or the reverse position R, the first eccentric ring 68 is set at an eccentric position as shown in FIG. 10. When the shifter 75 is moved to the first speed holding position $L_2$, the first eccentric ring 63 is set at an eccentric position where the eccentric radius is $\epsilon_{1L1}$ shown in FIG. 11. When the shifter 75 is moved to the second speed holding position $L_2$, the first eccentric ring 68 is set at an eccentric position where the eccentric radius is $\epsilon_{1L2}$ greater than the eccentric radius $\epsilon_{1L1}$ as shown in FIG. 12. When the shifter 75 is moved to the drive position D, the first eccentric ring 63 is moved through the positions shown in FIGS. 11 and 12 and a position where the eccentric radius is $\epsilon_{1D1}$ as shown in FIG. 13 to a position where the eccentric radius of the first eccentric ring 63 is increased to a maximum eccentric radius $\epsilon_{1D2}$ as shown in FIG. 14. As the eccentric radius increases from $\epsilon_{1L1}$ through $\epsilon_{1L2}$ and $\epsilon_{1D1}$ to $\epsilon_{1D2}$, the discharge range D increases from $D_{L1}$ through $D_{L2}$ and $D_{D1}$ to $D_{D2}$ and, consequently, the effective stroke of the pump plungers 9 increases to increase the displacement of the swash plate type hydraulic pump P as shown in FIG. 15.

Figure 16:
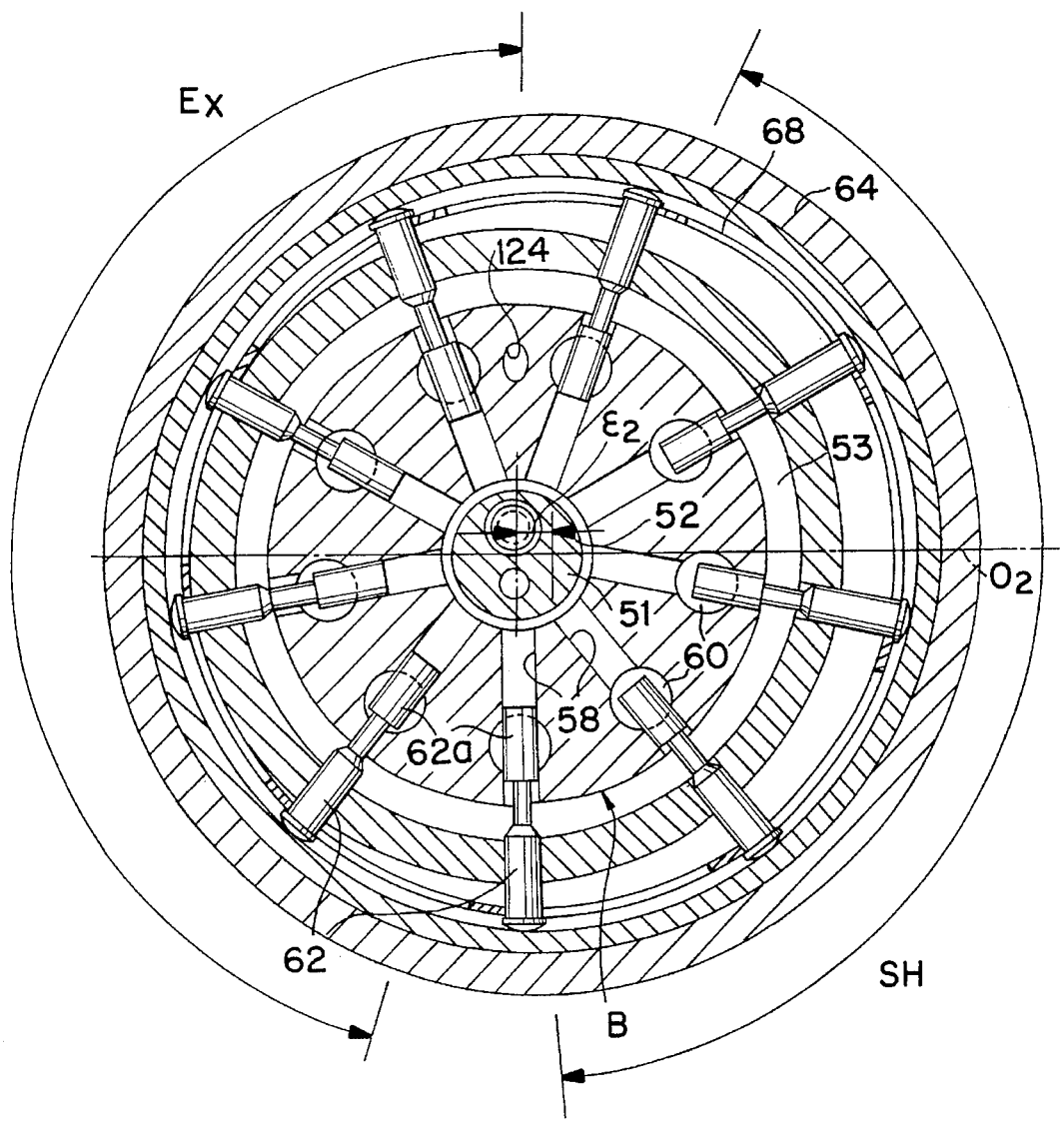
FIG. 16 is an enlarged sectional view taken on line 16—16 in FIG. 2.

The function of the second eccentric ring 64 will be described hereinafter with reference to FIG. 16. When the motor cylinder 17, i.e., the cylinder block B, rotates with the second eccentric ring 64 set at an eccentric position, each second distributing valve 62 is reciprocated radially of the cylinder block B for a stroke equal to twice the eccentric radius $\epsilon_2$ between an inner position and an outer position in the second valve hole 58. In the expansion range Ex of the hydraulic motor M, the second distributing valve 62 is moved to the inner position to connect the corresponding motor port 60 to the outer oil passage 53 and to disconnect the same from the inner oil passage 52, so that the high-pressure working fluid from the outer oil passage 53 is supplied into the motor cylinder bore 18 in which the motor plunger 19 is moving for an expansion stroke. In the contraction range SH of the hydraulic motor M, each second distributing valve 62 is moved to the outer position to connect the corresponding motor port 60 to the inner oil passage and to disconnect the same from the outer oil passage 53, so that the working fluid is discharged from the motor cylinder bore 18 in which the motor plunger 19 is moving for a contraction stroke into the inner oil passage 52.

The second eccentric ring 64 is supported by a pair of slide pins 88 parallel to the trunnion axis $0_2$ on the cylinder holder 24 in the following manner.

Figure 17:
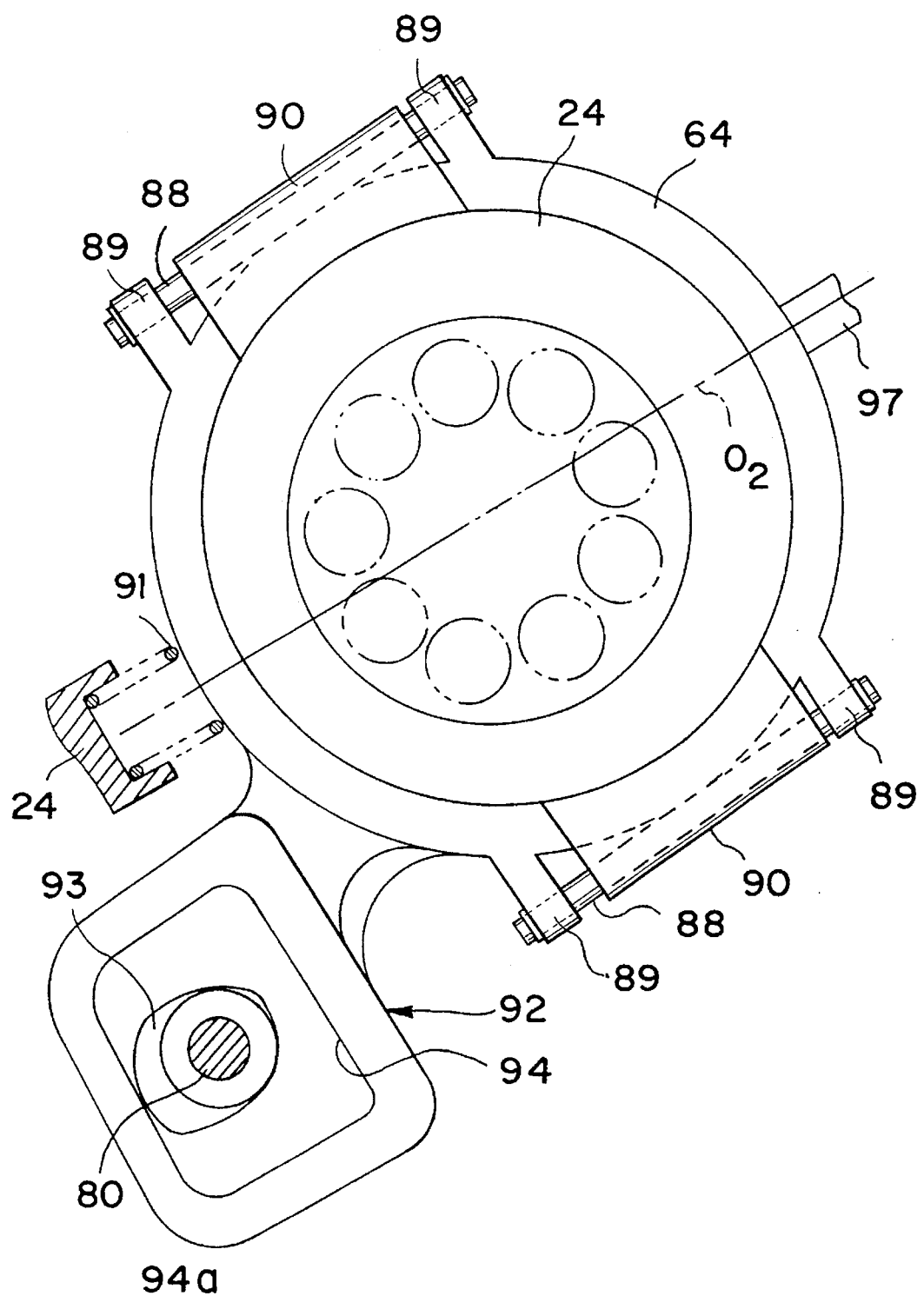
FIG. 17 is an enlarged sectional view taken on line 17—17 in FIG. 2.

As shown in FIG. 17, the opposite ends of each slide pin 88 is fixed to a pair of knuckles 89 projecting from the second eccentric ring 64 with the middle portion thereof slidably fitted in a guide knuckle 90 projecting from the cylinder holder 24. A compression spring 91 is compressed between the cylinder holder 24 and the second eccentric ring 64 on the trunnion axis $0_2$ so that the second eccentric ring 64 is movable along the trunnion axis $0_2$.

Incidentally, when the eccentric radius $\epsilon_2$ of the second eccentric ring 64 is changed, the contraction range SH changes accordingly. Consequently, the number of effective motor plungers 19 among all the motor plungers 19, i.e., the effective stroke of the motor plungers 19 change to change the displacement of the swash plate type hydraulic motor M. A second eccentric radius changing mechanism 92 is connected to the second eccentric ring 64.

The second eccentric radius changing mechanism 92 comprises the control shaft 80 rotatably supported on the casing 4, a shift cam 93 fixedly mounted on the control shaft 80, and a control lug formed integrally with the second eccentric ring 64 and provided with a control opening 94 in which the shift cam 93 is received.

A control surface 94a is formed in the inner surface of the control opening 94 so as to be in contact with the shift cam 93 by the agency of the spring 91. The shift cam 93 in contact with the control surface 94a determines the position of the second eccentric ring 64 on the trunnion axis $0_2$. When the control shaft 80 is set at a position corresponding to the Neutral position N, the eccentric radius $\epsilon_2$ of the second eccentric ring 64 is 0 (zero). When the control shaft 80 is set at a position corresponding to the drive position D, the second speed holding position $L_2$ or the first speed holding position $L_1$, the second eccentric ring 64 is dislocated from the position corresponding to the neutral position N in the direction in which the second eccentric ring 64 is biased by the spring 91. When the control shaft 80 is set at a position corresponding to the parking position P or the reverse position R, the second eccentric ring 64 is dislocated from the position corresponding to the neutral position N in a direction reverse to the direction in which the eccentric ring 64 is biased by the spring 91. When the second eccentric ring 64 is moved to the eccentric position corresponding to the drive position D, the second speed holding position $L_2$ or the first speed holding position $L_1$, the output shaft 31 extending from the motor cylinder 17 rotates in the normal direction. When the second eccentric ring 64 is moved to the eccentric position corresponding to the parking position P or the reverse position R, the output shaft 31 rotates in the reverse direction.

Incidentally, to change the displacement of the swash plate type hydraulic motor M by changing the eccentric radius $\epsilon_2$ of the second eccentric ring 64 by the second eccentric radius changing mechanism 92, the position of each motor port 60 on the second valve hole 58 and the size of the second distributing valve 62 are determined so as to meet conditions similar to those to be met by the swash plate type hydraulic pump P.

The cylinder block B is rotated by the sum of a reaction torque applied through the pump plungers 9 in the discharge stroke to the pump cylinder 7 by the pump swash plate 10 and a reaction torque applied through the motor plungers 19 in the expansion stroke to the motor cylinder 17 by the motor swash plate 20, and the torque of the cylinder block B is transmitted through the output shaft 31 to the secondary reduction gear 3.

The gear ratio, namely, the ratio of the rotating speed of the output shaft 31 to the rotating speed of the hollow input shaft 5, is given by the following expression.

(Gear ratio)=1+(Displacement of the hydraulic motor M)/(Displacement of the hydraulic pump P)

Accordingly, the range of the gear ratio can be widened by changing both the displacement of the hydraulic motor M and that of the hydraulic pump P. The speed can be changed from the first speed holding position $L_1$ to the second speed holding position $L_2$ by operating the control shaft 80 for shifting with the motor swash plate 20 inclined at a maximum inclination, the speed can be varied continuously to $D_2$ by the stepping motor 84 when the control shaft 80 is set at a position corresponding to the drive position D, and the range of gear ratio can be greatly widened by decreasing the inclination of the motor swash plate 20 by the stepping motor 29 to decrease the displacement of the swash plate type hydraulic motor M after the displacement of the swash plate type hydraulic pump P has been increased to a maximum.

Incidentally, when the second eccentric ring 64 is moved to a concentric position with the gear ratio set at "1" all the second distributing valves 62 disconnect the corresponding motor ports 60 perfectly from the outer oil passage 53, i.e., a high-pressure oil passage, and open the motor ports 60 slightly into the inner oil passage, i.e., a low-pressure oil passage.

Consequently, the hydraulic motor M is disconnected from the high-pressure outer oil passage 53, the displacement of the high-pressure system is reduced accordingly and, consequently, pressure leakage is reduced and the noncompressibility of the working fluid is enhanced to enhance transmission efficiency in a state where the gear ratio is "1". Moreover, since each motor cylinder bore 18 communicates with the low-pressure inner oil passage 52 by means of a narrow passage, the motor cylinder bores 18 are not closed completely.

An eccentric ring driving mechanism 96 is connected to the eccentric side of the second eccentric ring 64 on the trunnion axis $0_2$ to drive the second eccentric ring 64 biased toward an eccentric position by the spring 91 toward the concentric position.

The eccentric ring driving mechanism 96 comprises a driving member 97 pivotally supported on the cylinder holder 24 so as to be able to press the second eccentric ring 64 from outside. A hydraulic cylinder actuator 98 is connected to the driving member 97 to move the driving member 97 so as to drive the second eccentric ring 64 toward the concentric position when hydraulic pressure is applied thereto. A control valve 99 is provided that applies hydraulic pressure to the hydraulic cylinder actuator 98 when the motor swash plate 20 is turned to a predetermined inclined position in which the motor swash plate 20 is inclined at a given inclination near the upright position while the motor swash plate 20 is turned from an inclined position toward the upright position, and removes the hydraulic pressure from the hydraulic cylinder actuator 98 when the motor swash plate 20 is turned to the predetermined inclined position while the motor swash plate 20 is tilted from the upright position.

The driving member 97 is supported pivotally in its middle portion on the cylinder holder 24 by a support shaft 100 having an axis perpendicularly intersecting the trunnion axis $0_2$ and the axis of rotation of the cylinder block B, and one end of the driving member 97 is in contact with the second eccentric ring 64.

The hydraulic cylinder actuator 98 has a piston 103 slidably fitted in a bottomed cylinder bore 101 having an axis parallel to the trunnion axis $0_2$ formed in the cylinder holder 24 so as to form a pressure chamber 102 between the extremity thereof and the bottom of the cylinder bore 101. A rod 104 extends from the piston 103 and is in contact with the other end of the driving member 97.

When hydraulic pressure is applied to the pressure chamber 102 of the hydraulic cylinder actuator 98, the driving member 97 is turned in a direction to move the second eccentric ring 64 toward the concentric position. When the hydraulic pressure is removed from the pressure chamber 102, the second eccentric ring 64 is returned to an eccentric position by the resilience of the spring.

The control valve 99 has a valve casing 109, a valve element 108 slidably fitted in the valve casing 109 so as to be moved between a connecting position for connecting an oil feed passage 106 connected to an oil pump 105 to an oil passage 107 connected to the pressure chamber 102 of the hydraulic cylinder actuator 98 and a disconnecting position for opening the oil feed passage 106, and a spring for biasing the valve element 108 toward the disconnecting position. The valve element 108 is provided integrally and coaxially with a rod 110 which projects outside the valve casing 109. The extremity of the rod 110 is in contact with a swing lever 111. When the motor swash plate 20 is inclined at the given inclination while the motor swash plate holder 22 turns the motor swash plate 20 from an inclined position toward the upright position, the motor swash plate 22 turns the lever 11 so as to push the rod 110. Consequently, the control valve 99 is set in a position to apply hydraulic pressure to the hydraulic cylinder actuator 98.

The eccentric ring driving mechanism 96 holds the second eccentric ring 64 at the eccentric position while the motor swash plate 20 is in an inclined position, because the control valve 99 is in a state to remove pressure from the pressure chamber 102 of the hydraulic cylinder actuator 98. When turning the motor swash plate 20 from the inclined position to the upright position, the control valve 99 is set in a state to apply hydraulic pressure to the pressure chamber 102 when the motor swash plate 20 is turned to a position near the upright position. Consequently, the hydraulic cylinder actuator 98 turns the driving member 97 to drive the second eccentric ring 64 toward the concentric position.

Figure 18:
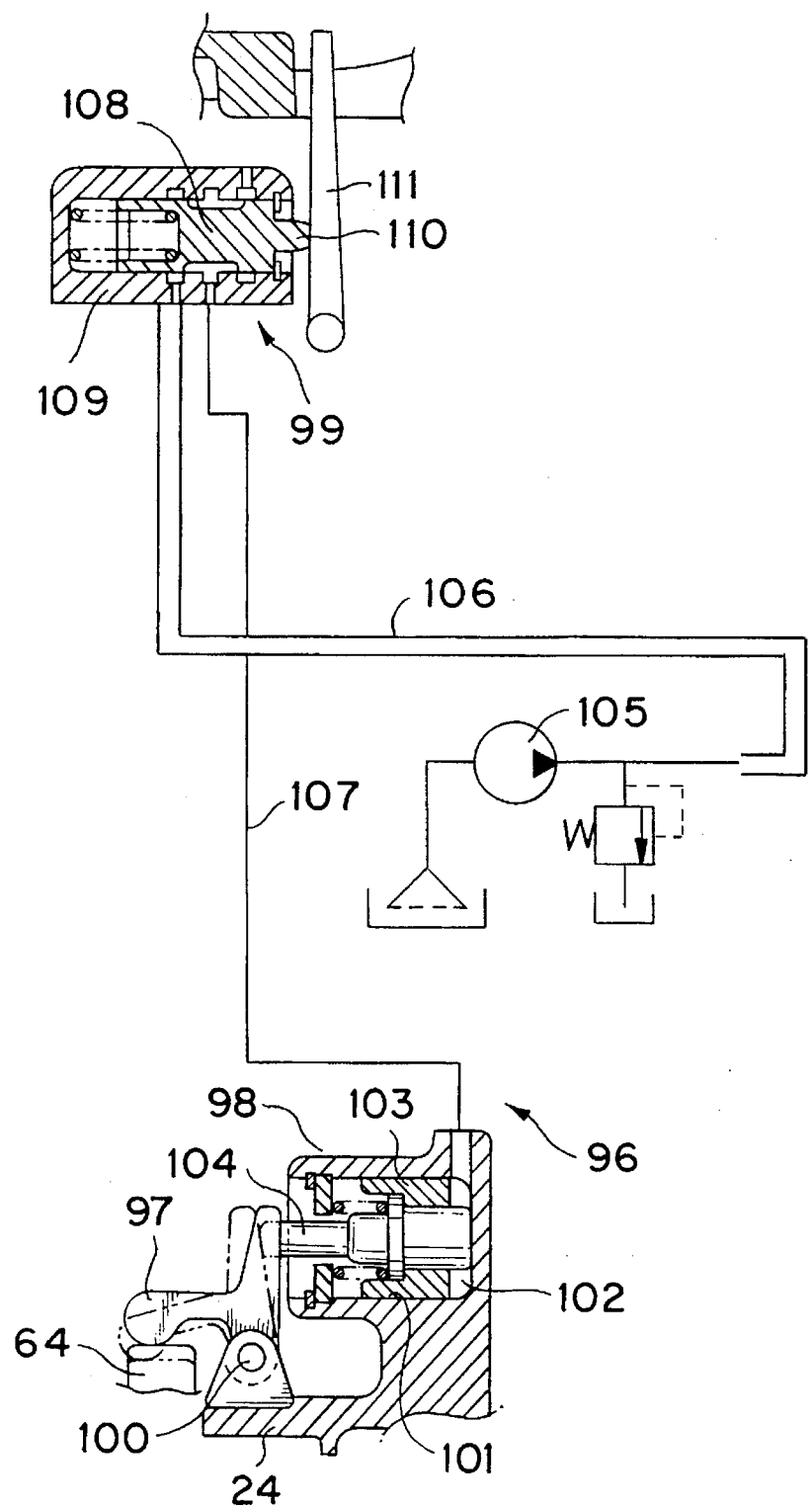
FIG. 18 is a hydraulic circuit diagram of an eccentric ring driving mechanism.

Referring again to FIGS. 4 and 5, a basically cylindrical filter unit 114 is inserted in the third bore 46 formed in the cylinder block B coaxially with the latter. The oil pump (FIG. 18) feeds the working fluid through the filter unit 114 into the cylinder block B.

A clutch valve 115, a pressure regulating valve 116, a first check valve 117 and a second check valve 118 are inserted in the first bore 44 formed in the cylinder block B.

The clutch valve 115 comprises the tubular valve element 51 slidably fitted in the first bore 44, a connecting tube 119 is connected to the valve element 51, an end cap 120 is fitted in one-end of the first bore 44 and retained in place with a snap ring 121 so as not to axially come off the first bore 44. A push rod 122 is connected to the connecting tube 119 and slidably penetrates the end cap 120 in a liquid-tight fashion. A return spring 123 is compressed between the connecting tube 119 and the end cap 120.

A radially oblique connecting passage 124 having an outer end opening into the outer oil passage 53 and an inner end opening into the first bore 44 is formed in the cylinder block B so as to extend radially inward and to incline away from the inner oil passage 52 and toward the second bore 45. The valve element 51 of the clutch valve 115 can be set at a clutch disengagement position (FIG. 4) to connect the connecting passage 124 to the second annular groove 50 and to disconnect the same from the first annular groove 49, or at a clutch engagement position (FIG. 5) to connect the connecting passage 124 to the first annular groove 49 and to disconnected the same from the second annular groove 50. The valve element 51 is provided with a connecting passage 125 dislocated from the axis thereof and extended across the opposite ends thereof. When hydraulic pressure is applied to the inner end of the push rod 122 through the replenishing oil passage 47, the valve element 51 is biased toward the clutch disengagement position.

As shown in FIG. 2, the extremity of the push rod 122 projecting from the output shaft 31 is in contact with a pressing member 126. The pressing member 126 is fixed to one end of a slide shaft 127 having an axis parallel to the axis of the cylinder block B and axially slidably supported on the casing 4. A come follower 128 fixed to the other end of the slide shaft 127 is in engagement with the second cam groove 129 of the shift drum 81.

Referring particularly to FIG. 9, the second cam groove 129 is formed in the shift drum 81 alongside the first cam groove 83. The second cam groove 129 sets the pressing member 126, hence the push rod 122, at an axial position corresponding to the parking position P, the reverse position R, the neutral position N, the drive position D, the second speed holding position $L_2$ or the first speed holding position $L_1$ according to the shifting operation of the control shaft 80. When set at a position corresponding to the parking position P or the neutral position N, the push rod 122 pushes the valve element 51 to the clutch engagement position.

The valve element 51 is provided in its middle portion with a partition wall 131, and the second check valve 118 is disposed on the side of the second annular groove 50 with respect to the partition wall 131. The second check valve 118 opens to allow replenishing working fluid to flow from the replenishing oil passage 47 into a valve chest 133 communicating with the second annular groove 50 when the pressure in the replenishing oil passage 47 is higher than the pressure in the valve chest 133.

A valve chest 134 communicating with the inner oil passage 52 is formed in the valve element 51 on the opposite side of the second check valve 118 with respect to the partition wall 131. A first check valve 118 is disposed in the valve element 51 so as to open to allow the working fluid to flow from the replenishing oil passage 47 into the valve chest 134 when the pressure in the replenishing oil passage 47 is higher than the pressure in the valve chest 134 by a predetermined value.

The pressure regulating valve 116 is disposed between the valve chests 133 and 134. The pressure in the valve chest 133 acts so as to open the pressure regulating valve 116 and the pressure in the valve chest 134 acts so as to close the pressure regulating valve 116. The pressure regulating valve 116 opens when the pressure in the valve chest 133 exceeds the pressure in the valve chest 134 at a predetermined ratio. The pressure regulating valve 116 suppresses excessive increase in the pressure in the valve chest 133, hence the outer oil passage 53 when the vehicle is started suddenly or accelerated at a high rate.

The operation of the first embodiment will be described hereinafter. In the swash plate type hydraulic pump P, the pump swash plate holder 12 formed integrally with the hollow input shaft 5 and holding the pump swash plate 10 at a fixed inclination is driven for rotation by the engine. The eccentric radius of the first eccentric ring 63 engaged with the outer ends of the first distributing valves 61 relative to the cylinder block B is varied to vary the displacement easily, which has been difficult. In the swash plate type hydraulic motor M, the inclination of the motor swash plate holder 22 holding the motor swash plate 20 and supported on the motor swash plate anchor 23 to the axis of rotation of the cylinder block B is variable, and the displacement can be varied by varying the eccentric radius of the second eccentric ring 64 engaged with the outer ends of the second distributing valves 62 relative to the axis of rotation of the cylinder block B by power lower than that necessary for varying the inclination of the motor swash plate holder 22. Since the number of the motor cylinder bores 18 to which a high pressure is applied can be reduced by reducing the displacement, the thrust load applied by the motor plungers 19 to the motor swash plate 20 is reduced, so that abrasion is reduced and the durability of the bearings and the like can be improved.

Since the displacement of the swash plate type hydraulic pump P is variable, the range of gear ratio of the hydromechanical continuously variable speed transmission T can be easily extended without increasing the size and weight of the swash plate type hydraulic motor M and high efficiency can be maintained at the top ratio. Furthermore, in the swash plate type hydraulic motor M, since the displacement is varied by varying the eccentric radius of the second eccentric ring 64 in addition to varying the inclination of the motor swash plate 20, the gear ratio can be quickly changed.

Incidentally, in the swash plate type hydraulic pump P and the swash plate type hydraulic motor M, since the radius $R_{f1}$ of the locus $C_{Pi}$ of the inner edges of the pump ports 59 and the motor ports 60, the radius $R_{01}$ of the locus $C_{PO}$ of the outer edges of the ports 59 and 60, the radius $R_{12}$ of the locus $C_{L1}$ of the inner edges of the lands 61a and 62a of the first distributing valves 61 and the second distributing valves 62, the radius $R_{02}$ of the locus $C_{LO}$ of the outer edges of the lands 61a and 62a meet conditions that $R_{f2}$ is greater than $R_{f1}$, $R_{02}$ is greater than $R_{01}$, and $(R_{02}-R_{f2})$ is approximately equal to $(R_{01}-R_{f1})$, the displacement can be changed by changing the eccentric radii of the first eccentric ring 63 and the second eccentric ring 64 and the displacement is dependent on those sizes and a high accuracy can be easily secured.

The eccentric radius changing mechanism 74 for changing the eccentric radius of the first eccentric ring of the swash plate type hydraulic pump P has the shifter 75 movable along the axis of the cylinder block B, and the cam 76 formed integrally with the shifter 75 so as to extend axially obliquely from the shifter 75 and to incline in one circumferential direction of the cylinder 7, and the first eccentric ring 63 is engaged with the opposite surfaces of the cam 76. Therefore, the first eccentric ring 63 can be held so as not to rattle. Since the control shaft 80, parallel to the axis of the cylinder block B, is rotatably supported on the casing 4 so as to be turned manually to a desired angular position, the shift fork 79 is engaged with the cam of the shift drum 81 fixed to the control shaft 80, the position of the shift fork 79 in the direction of the axis of the cylinder block B is determined by the angular position of the shift drum 81, and the shifter 74 and the shift fork 79 are engaged, a desired gear ratio can be easily maintained.

Since the shifter 75 is connected through the ball-and-screw mechanism 85 to the stepping motor 84, the eccentric radius of the first eccentric ring 63 can be accurately and steplessly controlled.

Figure 20:
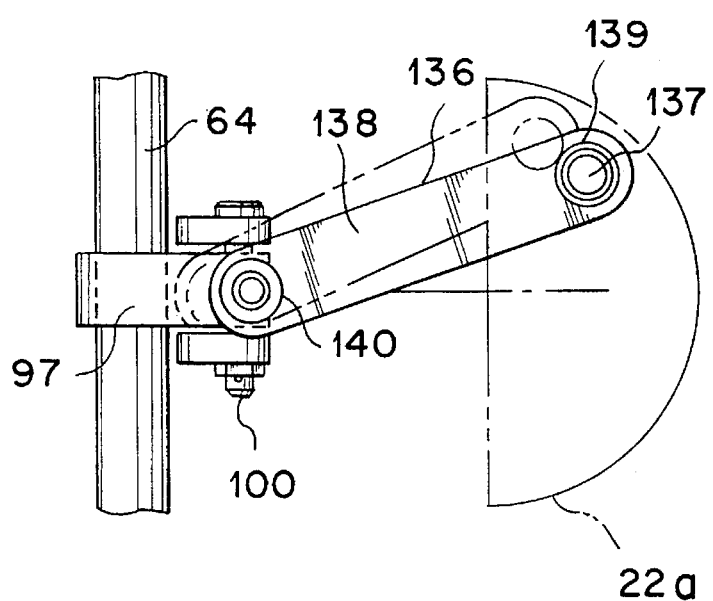
FIG. 20 is a view taken along the direction of the arrows 20 in FIG. 19.
Figure 19:
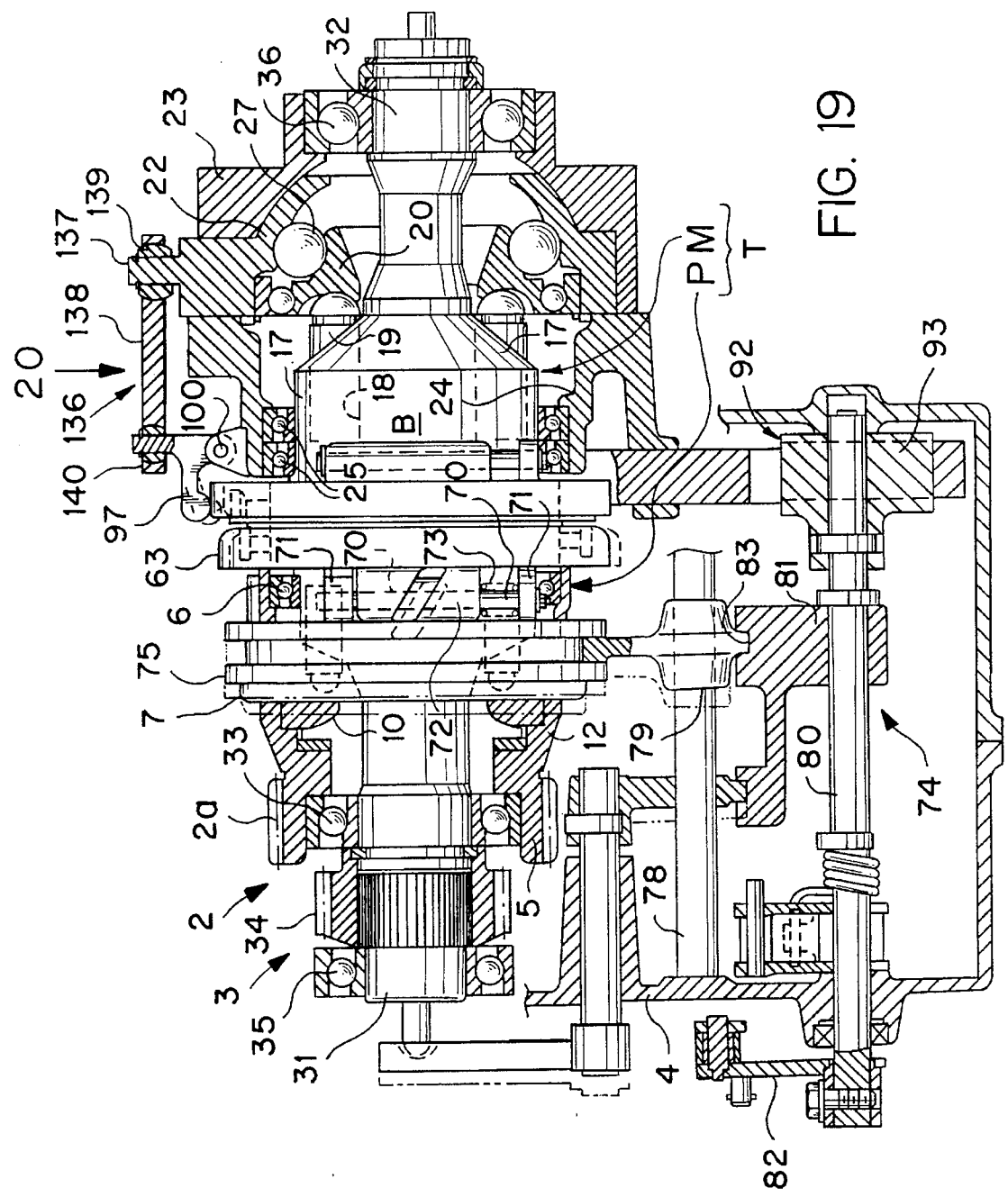
FIG. 19 is a sectional view, similar to FIG. 2, of a hydromechanical continuously variable speed transmission in a second embodiment according to the present invention.

A second embodiment of the present invention is shown in FIGS. 19 and 20, in which like parts corresponding to those of the first embodiment are designated by the same reference characters.

A swash plate type hydraulic motor M has a second eccentric ring 64 connected to an eccentric radius changing mechanism 136 that changes the eccentric radius of the second eccentric ring 64 according to the inclination of a motor swash plate 20. The eccentric radius changing mechanism 136 comprises a link 183 having a first end connected to a connecting shaft 137 positioned at a position dislocated from the trunnion axis 22a of a motor swash plate holder 22, and a driving member 97 connected to a second end of the link 138, and supported for swing motion by a shaft 100 on a cylinder holder 24 so as to be in contact with the second eccentric ring 64.

The first end of the link 138 is connected by a spherical joint 139 to the connecting shaft 137, and the second end of the link 138 is connected to the driving member 97 by a spherical joint 140.

In this second embodiment, the eccentric radius of the second eccentric ring 64 decreases as the inclination of the motor swash plate 20 is decreased. Therefore, when the number of motor plungers 19 on which a high pressure is applied can be reduced when the displacement is reduced, so that the thrust load applied by the motor plungers 19 on the motor swash plate 20 can be reduced to reduce abrasion and to improve the life of the bearings and the like.

Although the invention has been described in its preferred embodiments, the present invention is not limited to the foregoing embodiments specifically described herein and many changes and variations may be made therein without departing from the scope thereof as set forth in appended claims.

As is apparent form the foregoing description, of the present invention, the displacement of the hydraulic actuator can be easily changed by changing the eccentric radii of the eccentric rings capable of being moved radially of the cylinders because the eccentric radius changing means for changing the eccentric radii of the eccentric rings relative to the cylinders to change the effective stroke of the plungers are connected to the eccentric rings.

Although the swash plate is supported for rotation, the displacement can be changed, because the swash plate holder is rotatably supported on the casing and the swash plate is held at a given inclination to the axis of rotation of the cylinder on the swash plate holder.

In addition, the displacement can be surely changed and the accuracy of displacement control can be easily improved, because the distributing valves have lands for connecting the ports and the inner oil passage and disconnecting the ports from the inner oil passage by their axially inner ends and for connecting the ports and the outer oil passage and disconnecting the ports from the outer oil passage by their axially outer ends. The radius $R_{f2}$ of the locus of the inner ends of the lands is greater than the radius $R_{f1}$ of the locus of the inner edges of the ports along the axes of the valve holes, the radius $R_{02}$ of the locus of the outer ends of the lands is greater than the radius $R_{01}$ of the locus of the outer edges of the ports along the axes of the valve holes, $(R_{02}-R_{f2})$ is approximately equal to $(R_{01}-R_{f1})$.

The eccentric rings can be restrained from rattling, because the eccentric radius changing means comprises the shifter movable along the axis of the cylinder, and a cam formed integrally with the shifter so as to extend axially obliquely from the shifter and to incline in one circumferential direction of the cylinder, and the eccentric ring is in contact with the opposite surfaces of the cam extending along the circumferential direction of the cylinder.

The eccentric radius of the eccentric ring can be controlled electrically to improve the accuracy of control, because the shifter is driven by an electric motor.

A desired gear ratio can be held by a manual operation, because the control shaft is supported rotatably on the casing in parallel to the axis of the cylinder so as to be turned manually to determine its angular position, the shift drum is fixed to the control shaft, the shift fork is in engagement with the shift drum so that the position thereof along the axis of the cylinder is dependent on the angular position of the shift drum, and the shifter is in engagement with the cam.

The displacement can be changed by changing the eccentric radius of the eccentric ring and tilting the swash plate, because the swash plate holder holding the swash plate can be tilted about the trunnion axis perpendicular to the axis of rotation of the cylinder.

The number of the plungers on which high pressure acts can be reduced by reducing the displacement to reduce the thrust load applied by the plungers to the swash plate, so that abrasion can be reduced and the durability of the bearings and the like can be improved, because the eccentric radius changing means is capable of changing the eccentric radius of the eccentric ring according to the inclination of the swash plate.

The thrust load applied by the plungers to the swash plate can be surely reduced to reduce abrasion and to improve the durability of the bearings and the like, because the eccentric ring is biased by the spring so as to be dislocated from the axis of the cylinder, and the eccentric radius changing means is capable of decreasing the eccentric radius of the eccentric ring as the inclination of the swash plate is decreased.

The range of gear ratio can be easily widened without increasing the size and weight of the hydraulic motor, because the motor swash plate of the hydraulic motor can be inclined, and the eccentric radius changing means for changing the effective stroke of the pump plungers by changing the eccentric radius of the first eccentric ring relative to the cylinder block is connected to the first eccentric ring capable of moving radially of the cylinder block of the hydraulic pump.

Shocks caused by an increase in efficiency in locking up with the transmission set in the top gear are removed as the efficiency at the top gear increases, because the eccentric radius changing means capable of decreasing the eccentric radius of the second eccentric ring of the hydraulic motor capable of varying the inclination of the swash plate as the inclination of the motor swash plate is decreased is connected to the second eccentric ring biased so as to be dislocated in one direction from the axis of the cylinder block by the spring.

The rotation of the output shaft can be reversed without using any special reversing mechanism, because the eccentric radius changing means capable of moving the second eccentric ring capable of being moved radially of the cylinder block between the eccentric position for making the output shaft connected to the motor cylinder rotate in the normal direction and the eccentric position for making the output shaft rotate in the reverse direction is connected to the second eccentric ring.

A high efficiency can be maintained with the transmission set in the top gear, because the eccentric radius of the first eccentric ring is increased with the motor swash plate held at the maximum inclination and the inclination of the motor swash plate is decreased after the eccentric radius of the first eccentric ring has been increased to the maximum.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A swash plate hydraulic actuator comprising:

a casing;

a cylinder block including first and second cylinders supported on the casing for rotation about an axis of rotation, said cylinders being provided with a plurality of cylinder bores arranged on a circle;

an annular inner oil passage formed in an inner circumference of the cylinder block;

an annular outer oil passage formed in an outer circumference of the cylinder block;

a plurality of radial valve holes extending between the annular inner oil passage and the annular outer oil passage and respectively having ports opening into the cylinder bores;

plungers slidably fitted respectively in the cylinder bores;

first and second swash plates;

first and second swash plate holders for holding the first and second swash plates, respectively, for contacting the first and second swash plates with one end of each of the plungers projecting from the cylinders;

distributing valves slidably fitted in the valve holes for connecting the ports alternately to the inner oil passage and the outer oil passage;

first and second eccentric rings held on the first and second swash plate holders, respectively, for being in contact with the outer ends of the distributing valves;

said eccentric rings being selectively shifted radially of the cylinders by eccentric radius changing means for changing the eccentric radii of the eccentric rings relative to the cylinders for changing the effective stroke of the plungers;

wherein a discharge range of said first cylinder varies as the eccentric radius of the first eccentric ring changes, with a phase angle of the discharge range remaining constant, and wherein an amount of eccentricity of each of said eccentric rings varies, with a phase angle remaining constant.

2. The swash plate hydraulic actuator according to claim 1, wherein the first swash plate holder is supported for rotation on the casing, and the first swash plate is held at a fixed inclination to the axis of rotation of the cylinder on the first swash plate holder.

3. A swash plate hydraulic actuator comprising:

a casing;

a cylinder block including first and second cylinders supported on the casing for rotation about an axis of rotation, said cylinders being provided with a plurality of cylinder bores arranged on a circle;

an annular inner oil passage formed in an inner circumference of the cylinder block;

an annular outer oil passage formed in an outer circumference of the cylinder block;

a plurality of radial valve holes extending between the annular inner oil passage and the annular outer oil passage and respectively having ports opening into the cylinder bores;

plungers slidably fitted respectively in the cylinder bores;

first and second swash plates;

first and second swash plate holders for holding the first and second swash plates, respectively, for contacting the first and second swash plates with one end of each of the plungers projecting from the cylinders;

distributing valves slidably fitted in the valve holes for connecting the ports alternately to the inner oil passage and the outer oil passage;

first and second eccentric rings held on the first and second swash plate holders, respectively, for being in contact with the outer ends of the distributing valves;

said eccentric rings being selectively shifted radially of the cylinders by eccentric radius changing means for changing the eccentric radii of the eccentric rings relative to the cylinders for changing the effective stroke of the plungers;

wherein the eccentric radius changing means includes a shifter movable along the axis of rotation, and a cam formed integrally with the shifter for extending axially obliquely from the shifter and to incline in one circumferential direction of the first cylinder, and wherein the first eccentric ring is in engagement with the cam so as to be controlled by the opposite surfaces of the cam extending along the circumferential direction of the first cylinder.

4. The swash plate hydraulic actuator according to claim 3, wherein the first swash plate holder is supported for rotation on the casing, and the first swash plate is held at a fixed inclination to the axis of rotation of the cylinder on the first swash plate holder.

5. The swash plate hydraulic actuator according to claim 4, wherein the distributing valves include lands for connecting the ports and the inner oil passage and disconnecting the ports from the inner oil passage by their axially inner ends and for connecting the ports and the outer oil passage and disconnecting the ports from the outer oil passage by their axially outer ends, $R_{I2}$ is greater than $R_{I1}$, $R_{O2}$ is greater than $R_{O1}$, and $(R_{O2}-R_{I2})$ is approximately equal to $(R_{O1}-R_{I1})$, where $R_{I1}$ is the radius of the circular locus $(C_{PI})$ of the inner edges of the ports along the axes of the valve holes, $R_{O1}$ is the radius of the circular locus $(C_{PO})$ of the outer edges of the ports along the axes of the valve holes $R_{I2}$ is the radius of the circular locus $(C_{Li})$ of the inner edges of the lands and $R_{O2}$ is the radius of the circular locus $(C_{LO})$ of the outer edges of the lands.

6. The swash plate hydraulic actuator according to claim 3, wherein the distributing valves include lands for connecting the ports and the inner oil passage and disconnecting the ports from the inner oil passage by their axially inner ends and for connecting the ports and the outer oil passage and disconnecting the ports from the outer oil passage by their axially outer ends, $R_{I2}$ is greater than $R_{I1}$, $R_{O2}$ is greater than $R_{O1}$, and $(R_{O2}-R_{I2})$ is approximately equal to $(R_{O1}-R_{I1})$, where $R_{I1}$ is the radius of the circular locus $(C_{PI})$ of the inner edges of the ports along the axes of the valve holes, $R_{O1}$ is the radius of the circular locus $(C_{PO})$ of the outer edges of the ports along the axes of the valve holes $R_{I2}$ is the radius of the circular locus $(C_{LI})$ of the inner edges of the lands and $R_{O2}$ is the radius of the circular locus $(C_{LO})$ of the outer edges of the lands.

7. The swash plate hydraulic actuator according to claim 3, wherein the shifter is connected to an electric motor.

8. The swash plate hydraulic actuator according to claim 3, wherein a control shaft is rotatably supported on the casing in parallel to the axis of rotation the cylinders for manual turning to determine its angular position, a shift drum is fixed to the control shaft, a shift fork is in engagement with the shift drum so that the position thereof along the axis of rotation of the cylinders is dependent on the angular position of the shift drum, and the shifter is in engagement with the shift fork.

9. A swash plate hydraulic actuator comprising:

a casing;

a cylinder block including first and second cylinders supported on the casing for rotation about an axis of rotation, said cylinders being provided with a plurality of cylinder bores arranged on a circle;

an annular inner oil passage formed in an inner circumference of the cylinder block;

an annular outer oil passage formed in an outer circumference of the cylinder block;

a plurality of radial valve holes extending between the annular inner oil passage and the annular outer oil passage and respectively having ports opening into the cylinder bores;

plungers slidably fitted respectively in the cylinder bores;

first and second swash plates;

first and second swash plate holders for holding the first and second swash plates, respectively, for contacting the first and second swash plates with one end of each of the plungers projecting from the cylinders, the second swash plate holder holding the second swash plate for inclined movement about an axis of trunnions perpendicular to the axis of rotation of the cylinders;

distributing valves slidably fitted in the valve holes for connecting the ports alternately to the inner oil passage and the outer oil passage;

first and second eccentric rings held on the first and second swash plate holders, respectively, for being in contact with the outer ends of the distributing valves;

said eccentric rings being selectively shifted radially of the cylinders by eccentric radius changing means for changing the eccentric radii of the eccentric rings relative to the cylinders for changing the effective stroke of the plungers;

wherein the eccentric radius changing means changes the eccentric radius of the second eccentric ring according to the inclination of the second swash plate.

10. The swash plate hydraulic actuator according to claim 9, wherein the first swash plate holder is supported for rotation on the casing, and the first swash plate is held at a fixed inclination to the axis of rotation of the cylinder on the first swash plate holder.

11. The swash plate hydraulic actuator according to claim 10, wherein the distributing valves include lands for connecting the ports and the inner oil passage and disconnecting the ports from the inner oil passage by their axially inner ends and for connecting the ports and the outer oil passage and disconnecting the ports from the outer oil passage by their axially outer ends, $R_{J2}$ is greater than $R_{J1}$, $R_{O2}$ is greater than $R_{O1}$, and $(R_{O2}-R_{J2})$ is approximately equal to $(R_{O1}-R_{J1})$, where $R_{J1}$ is the radius of the circular locus $(C_{PI})$ of the inner edges of the ports along the axes of the valve holes, $R_{O1}$ is the radius of the circular locus $(C_{PO})$ of the outer edges of the ports along the axes of the valve holes $R_{J2}$ is the radius of the circular locus $(C_{LI})$ of the inner edges of the lands and $R_{O2}$ is the radius of the circular locus $(C_{LO})$ of the outer edges of the lands.

12. The swash plate hydraulic actuator according to claim 10, wherein the eccentric radius changing means includes a shifter movable along the axis of rotation, and a cam formed integrally with the shifter for extending axially obliquely from the shifter and to incline in one circumferential direction of the first cylinder, and wherein the first eccentric ring is in engagement with the cam so as to be controlled by the opposite surfaces of the cam extending along the circumferential direction of the first cylinder.

13. The swash plate hydraulic actuator according to claim 9, wherein the distributing valves include lands for connecting the ports and the inner oil passage and disconnecting the ports from the inner oil passage by their axially inner ends and for connecting the ports and the outer oil passage and disconnecting the ports from the outer oil passage by their axially outer ends, $R_{J2}$ is greater than $R_{J1}$, $R_{O2}$ is greater than $R_{O1}$, and $(R_{O2}-R_{J2})$ is approximately equal to $(R_{O1}-R_{J1})$, where $R_{J1}$ is the radius of the circular locus $(C_{PI})$ of the inner edges of the ports along the axes of the valve holes, $R_{O1}$ is the radius of the circular locus $(C_{PO})$ of the outer edges of the ports along the axes of the valve holes $R_{J2}$ is the radius of the circular locus $(C_{LI})$ of the inner edges of the lands and $R_{O2}$ is the radius of the circular locus $(C_{LO})$ of the outer edges of the lands.

14. The swash plate hydraulic actuator according to claim 13, wherein the eccentric radius changing means includes a shifter movable along the axis of rotation, and a cam formed integrally with the shifter for extending axially obliquely from the shifter and to incline in one circumferential direction of the first cylinder, and wherein the first eccentric ring is in engagement with the cam so as to be controlled by the opposite surfaces of the cam extending along the circumferential direction of the first cylinder.

15. The swash plate hydraulic actuator according to claim 9, wherein the eccentric radius changing means includes a shifter movable along the axis of rotation, and a cam formed integrally with the shifter for extending axially obliquely from the shifter and to incline in one circumferential direction of the first cylinder, and wherein the first eccentric ring is in engagement with the cam so as to be controlled by the opposite surfaces of the cam extending along the circumferential direction of the first cylinder.

16. The swash plate hydraulic actuator according to claim 15, wherein the shifter is connected to an electric motor.

17. The swash plate hydraulic actuator according to claim 15, wherein a control shaft is rotatably supported on the casing in parallel to the axis of rotation of the cylinders for manual turning to determine its angular position, a shift drum is fixed to the control shaft, a shift fork is in engagement with the shift drum so that the position thereof along the axis of rotation of the cylinders is dependent on the angular position of the shift drum, and the shifter is in engagement with the shift fork.

18. The swash plate hydraulic actuator according to claim 9, wherein the second eccentric ring is biased by a spring so that the center thereof is dislocated from the axis of rotation of the cylinders and the eccentric radius changing means decreases the eccentric radius of the second eccentric ring as the inclination of the second swash plate is decreased.

19. A hydromechanical continuously variable speed transmission comprising:

a casing;

a cylinder block supported for rotation on the casing and provided with a plurality of pump cylinder bores arranged on a circle and motor cylinder bores;

an annular inner oil passage formed in an inner circumference of the cylinder block;

an annular outer oil passage formed in an outer circumference of the cylinder block;

a plurality of radial first valve holes formed for extending between the inner oil passage and the outer oil passage and to open at pump ports into the pump cylinder bores, and a plurality of radial second valve holes formed for extending between the inner oil passage and the outer oil passage and to open at motor ports into the motor cylinder bores;

pump plungers slidably fitted in the pump cylinder bores;

motor plungers slidably fitted in the motor cylinder bores;

a pump swash plate;

a pump swash plate holder rotatably supported on the casing and holding the pump swash plate at a fixed inclination for maintaining the pump swash plate in contact with one end of each of the pump plungers projecting from the cylinder block;

a motor swash plate;

a motor swash plate holder for holding the motor swash plate in contact with one end of each of the motor plungers projecting from the cylinder block, the motor swash plate holder holding the motor swash plate for inclined movement about an axis perpendicular to an axis of rotation of the cylinder block;

first distributing valves slidably fitted in the first valve holes to connect the pump ports alternately to the inner oil passage and the outer oil passage;

second distributing valves slidably fitted in the second valve holes for connecting the motor ports alternately to the inner oil passage and the outer oil passage;

a first eccentric ring supported on the pump swash plate holder for being in contact with the outer ends of the first distributing valves;

a second eccentric ring supported on the motor swash plate holder for being in contact with the outer ends of the second distributing valves;

an eccentric radius changing means connected to the first eccentric ring for changing the eccentric radius of the first eccentric ring relative to the cylinder block to change the effective stroke of the pump plungers, said eccentric radius changing means changing the eccentric radius of the second eccentric ring according to the inclination of the motor swash plate.

20. The hydromechanical continuously variable speed transmission according to claim 19, wherein the second eccentric ring is movable radially of the cylinder block and is biased by a spring so that the center thereof is dislocated in a direction from the axis of the cylinder block, and an eccentric radius changing means is connected to the second eccentric ring to decrease the eccentric radius of the second eccentric ring as the inclination of the motor swash plate is decreased.

21. The hydromechanical continuously variable speed transmission according to claim 20, wherein the second eccentric ring is movable radially of the cylinder block, and the eccentric radius changing means is connected to the second eccentric ring for moving the second eccentric ring between an eccentric position for connecting an output shaft to a motor cylinder for rotation in the normal direction and an eccentric position for making the output shaft rotate in the reverse direction.

22. The hydromechanical continuously variable speed transmission according to claim 19, wherein the second eccentric ring is movable radially of the cylinder block, and an eccentric radius changing means is connected to the second eccentric ring for moving the second eccentric ring between an eccentric position for connecting an output shaft to a motor cylinder for rotation in the normal direction and an eccentric position for making the output shaft rotate in the reverse direction.

23. A method of controlling a hydromechanical continuously variable speed transmission having a casing; a cylinder block supported for rotation on the casing and provided with a plurality of pump cylinder bores arranged on a circle and motor cylinder bores; an annular inner oil passage formed in an inner circumference of the cylinder block; an annular outer oil passage formed in an outer circumference of the cylinder block; a plurality of radial first valve holes formed for extending between the inner oil passage and the outer oil passage and to open at pump ports into the pump cylinder bores, and a plurality of radial second valve holes formed for extending between the inner oil passage and the outer oil passage and to open at motor ports into the motor cylinder bores; pump plungers slidably fitted in the pump cylinder bores; motor plungers slidably fitted in the motor cylinder bores; a pump swash plate; a pump swash plate holder rotatably supported on the casing and holding the pump swash plate at a fixed inclination for maintaining the pump swash plate in contact with one end of each of the pump plungers projecting from the cylinder block; a motor swash plate; a motor swash plate holder for holding the motor swash plate in contact with one end of each of the motor plungers projecting from the cylinder block, the motor swash plate holder holding the motor swash plate for inclined movement about an axis perpendicular to an axis of rotation of the cylinder block; first distributing valves slidably fitted in the first valve holes to connect the pump ports alternately to the inner oil passage and the outer oil passage; second distributing valves slidably fitted in the second valve holes for connecting the motor ports alternately to the inner oil passage and the outer oil passage; a first eccentric ring supported on the pump swash plate holder for being in contact with the outer ends of the first distributing valves; a second eccentric ring supported on the motor swash plate holder for being in contact with the outer ends of the second distributing valves; an eccentric radius changing means connected to the first eccentric ring for changing the eccentric radius of the first eccentric ring relative to the cylinder block to change the effective stroke of the pump plungers, said eccentric radius changing means changing the eccentric radius of the second eccentric ring according to the inclination of the motor swash plate, said method comprising the following steps:

increasing the eccentric radius of the first eccentric ring with the motor swash plate held at a maximum inclination; and decreasing the inclination of the motor swash plate after the eccentric radius of the first eccentric ring has reached a maximum;

wherein the speed of the hydromechanical continuously variable speed transmission is increased.

\* \* \* \* \*